March 13, 1956 A. A. REID 2,737,765
MACHINE FOR FOLDING AND SEALING SHIRTS
Filed Jan. 21, 1952 10 Sheets-Sheet 1

INVENTOR
ALAN A. REID
BY Braddock and Braddock
ATTORNEYS

March 13, 1956 A. A. REID 2,737,765
MACHINE FOR FOLDING AND SEALING SHIRTS
Filed Jan. 21, 1952 10 Sheets-Sheet 2

INVENTOR
ALAN A. REID
BY Braddock and Braddock
ATTORNEYS

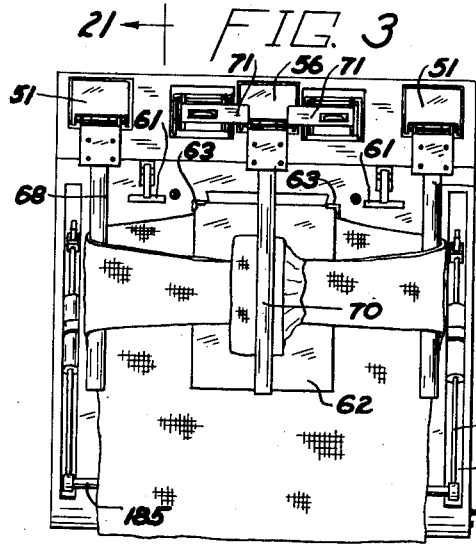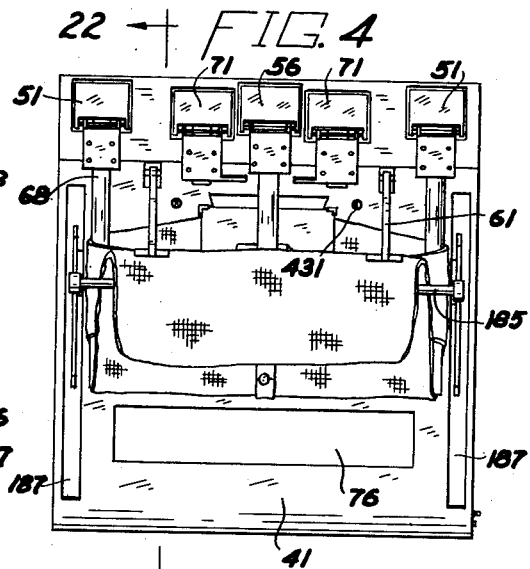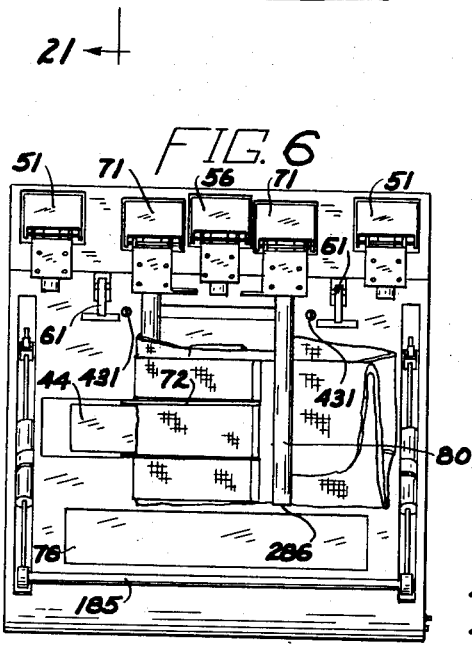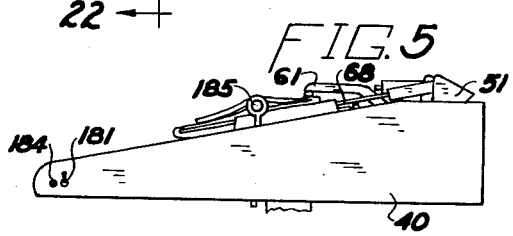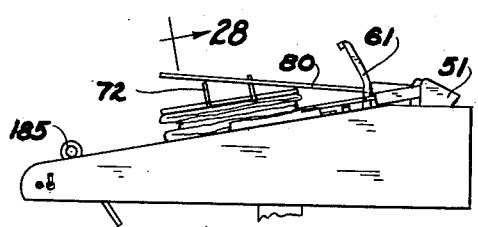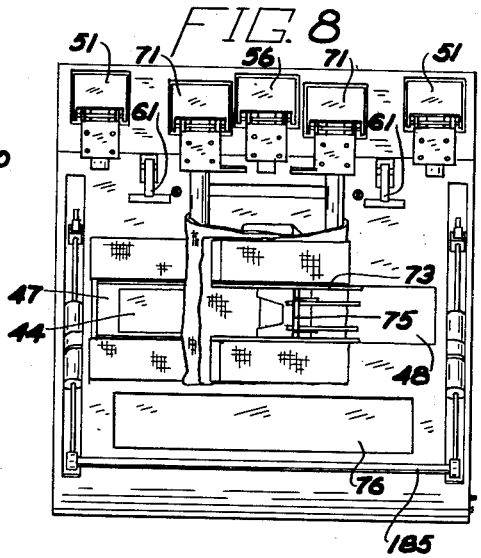

March 13, 1956  A. A. REID  2,737,765
MACHINE FOR FOLDING AND SEALING SHIRTS
Filed Jan. 21, 1952  10 Sheets-Sheet 4

INVENTOR
ALAN A. REID
BY Braddock and Braddock
ATTORNEYS

March 13, 1956  A. A. REID  2,737,765
MACHINE FOR FOLDING AND SEALING SHIRTS
Filed Jan. 21, 1952  10 Sheets-Sheet 5
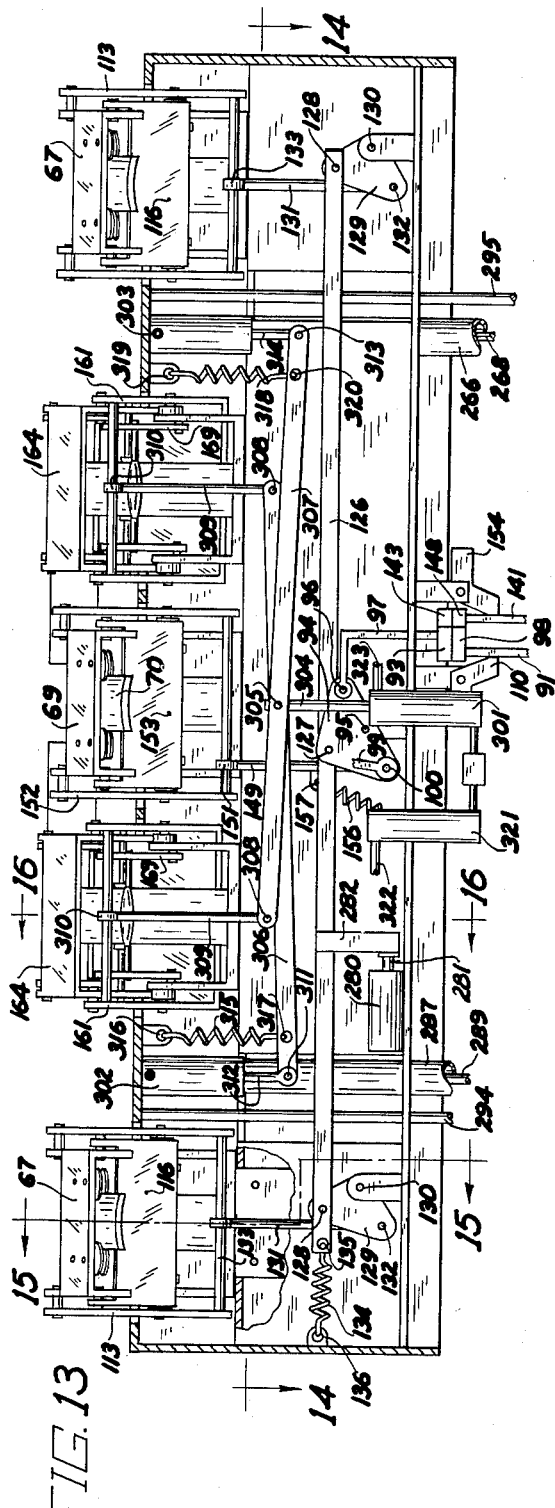
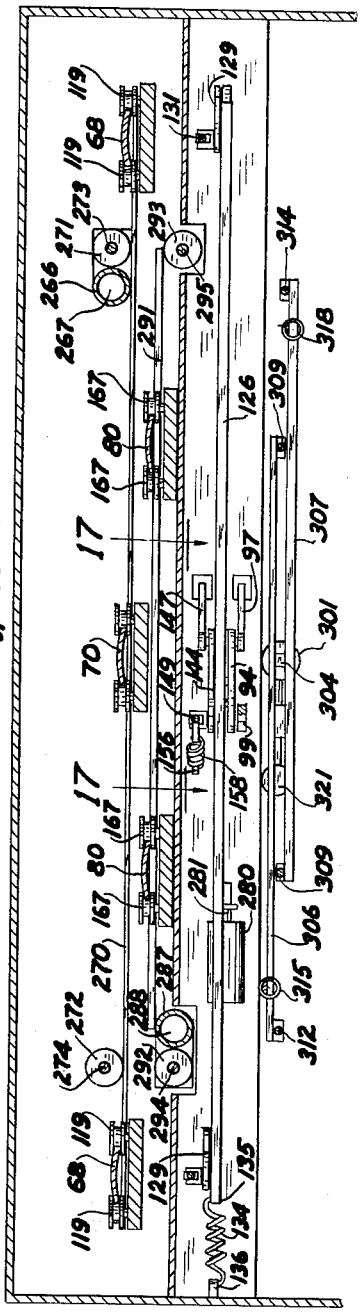
INVENTOR
ALAN A. REID
BY Braddock and Braddock
ATTORNEYS INVENTOR
ALAN A. REID
BY Braddock and Braddock
ATTORNEYS March 13, 1956 A. A. REID 2,737,765
MACHINE FOR FOLDING AND SEALING SHIRTS
Filed Jan. 21, 1952 10 Sheets-Sheet 7
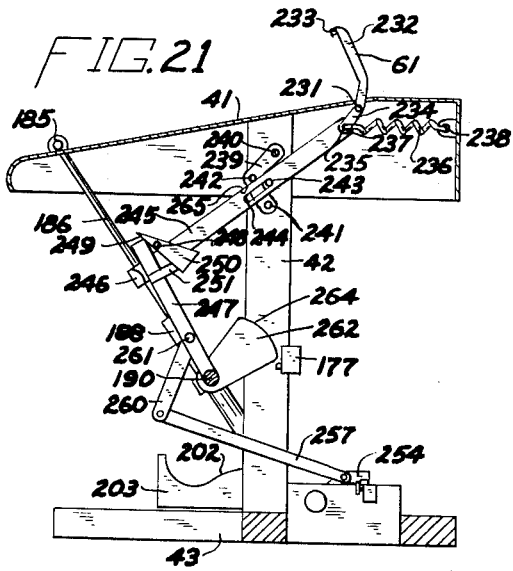
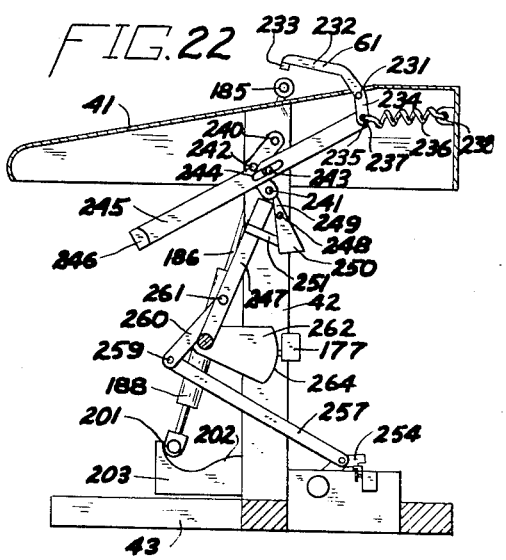
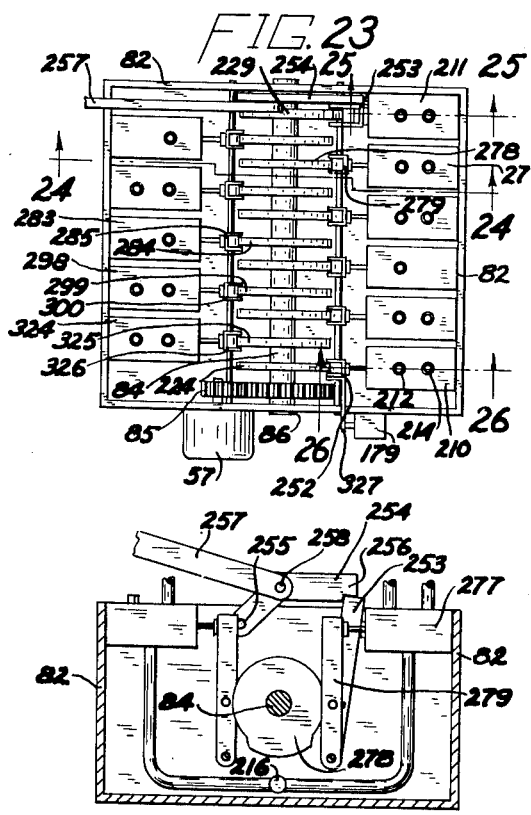
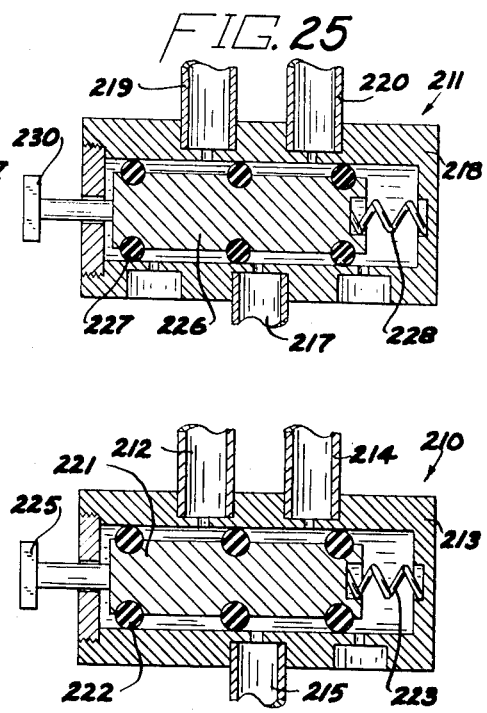
INVENTOR
ALAN A. REID
BY Braddock and Braddock
ATTORNEYS

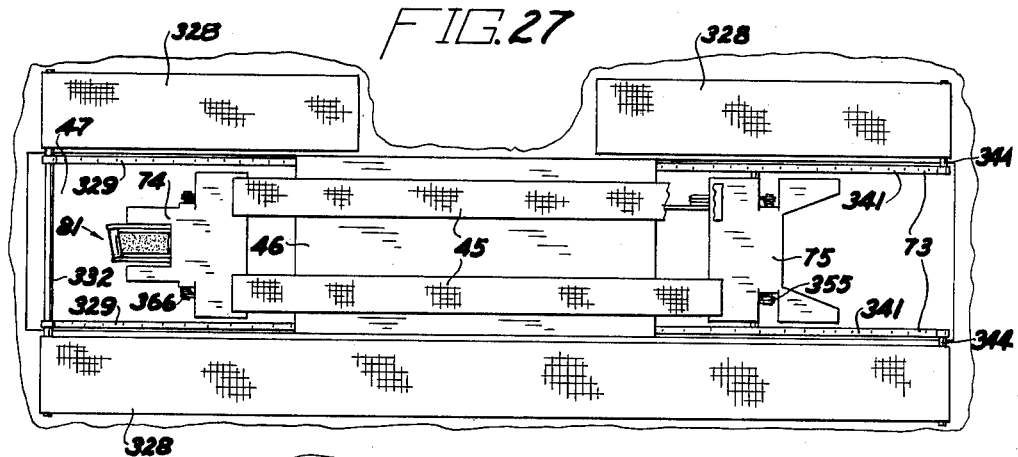
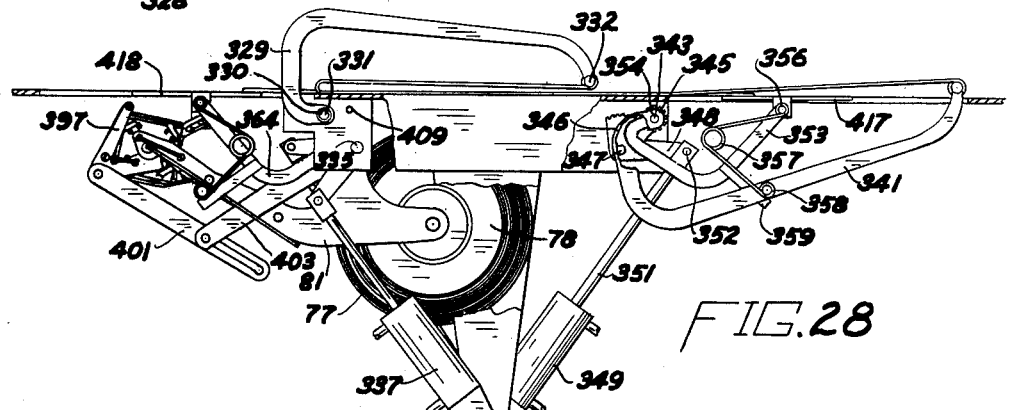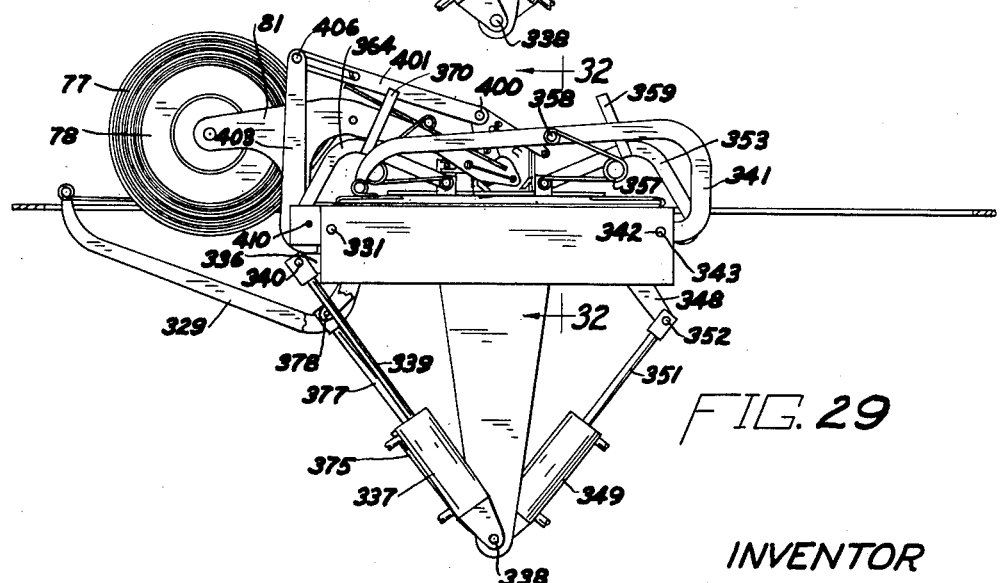

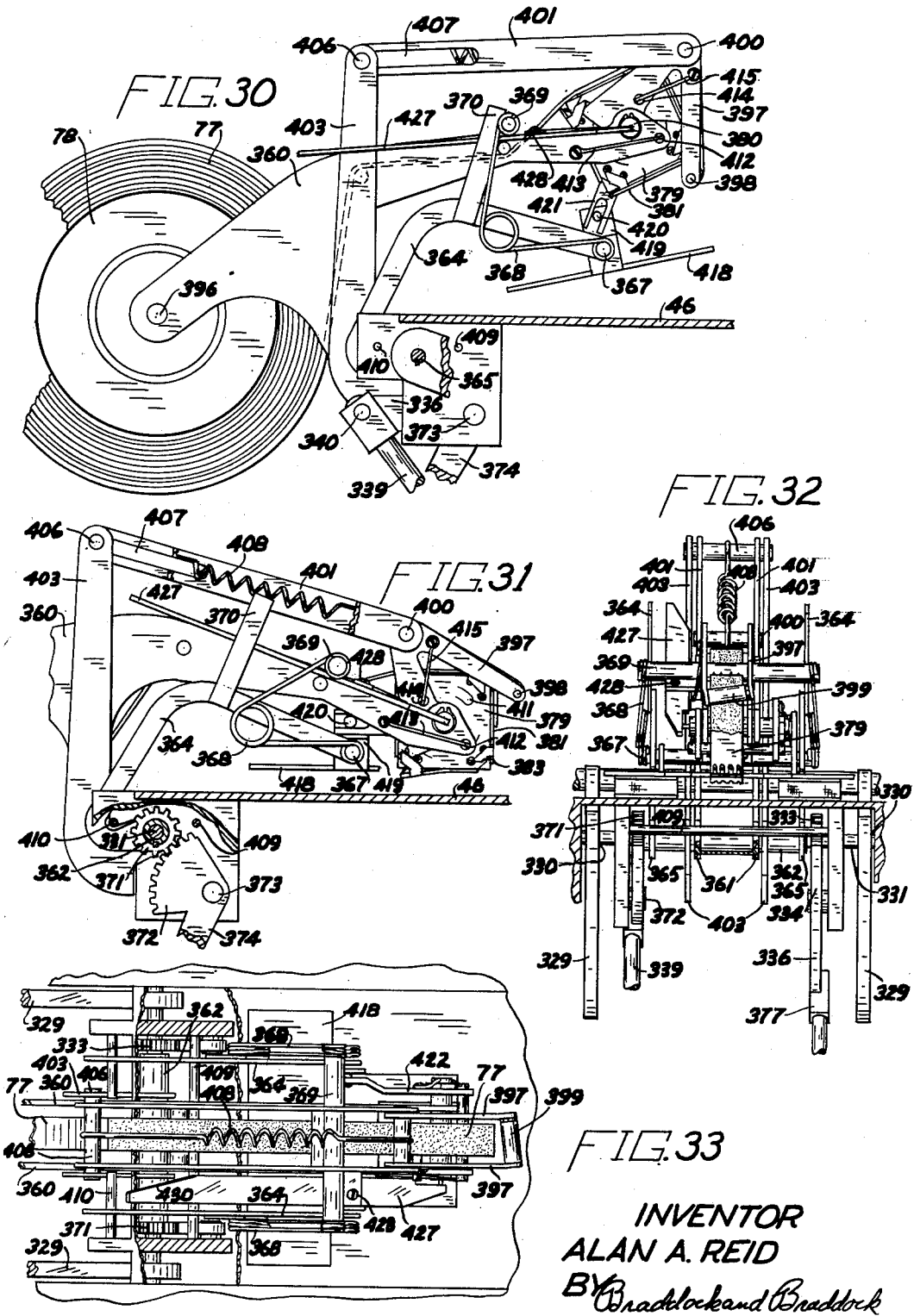
March 13, 1956 — A. A. REID — 2,737,765
MACHINE FOR FOLDING AND SEALING SHIRTS
Filed Jan. 21, 1952 — 10 Sheets-Sheet 9
INVENTOR
ALAN A. REID
BY Braddock and Braddock
ATTORNEYS March 13, 1956 A. A. REID 2,737,765
MACHINE FOR FOLDING AND SEALING SHIRTS
Filed Jan. 21, 1952 10 Sheets-Sheet 10
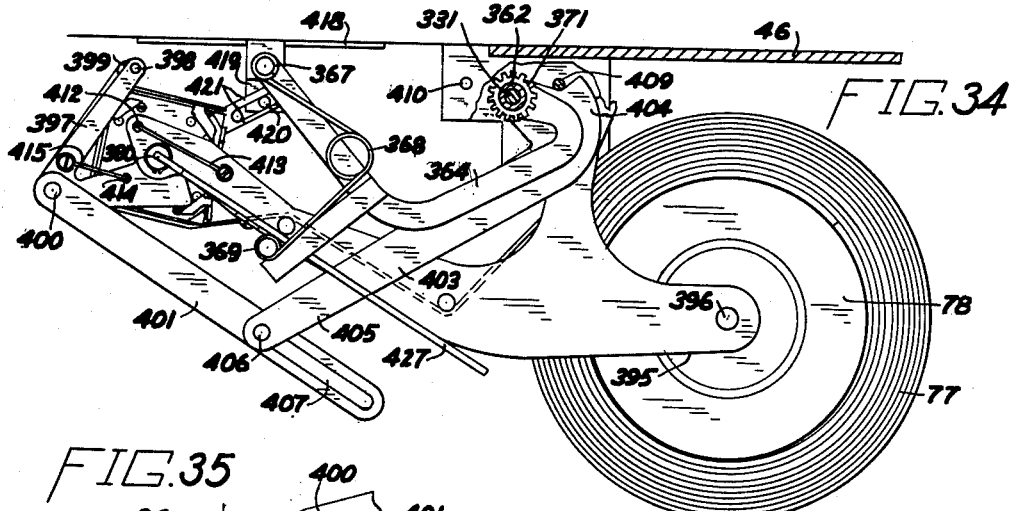
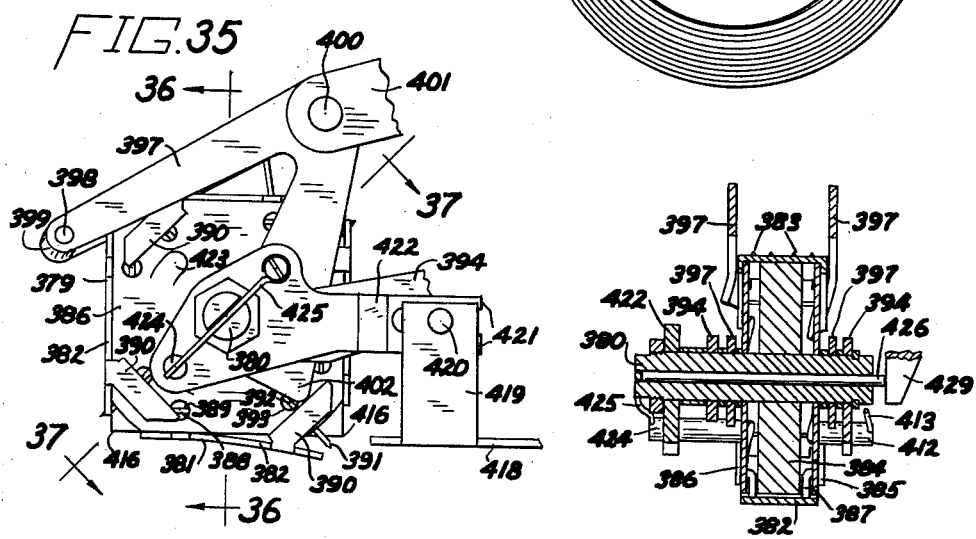
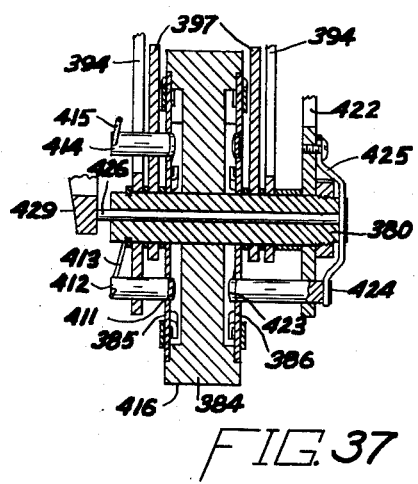
INVENTOR
ALAN A. REID
BY Braddock and Braddock
ATTORNEYS

United States Patent Office 2,737,765
Patented Mar. 13, 1956

2,737,765
MACHINE FOR FOLDING AND SEALING SHIRTS

Alan A. Reid, Minneapolis, Minn., assignor of one-half to West D. Stotts, Minneapolis, Minn.

Application January 21, 1952, Serial No. 267,372

50 Claims. (Cl. 53—50)

This application is a continuation in part of my pending application Serial No. 63,817, for Folding Machine, filed December 6, 1948, and Serial No. 113,510, for Machine for Folding and Sealing, filed September 1, 1949.

The invention herein has relation to a machine capable of being employed to fold various types of articles or materials and to apply sealing elements to the articles or materials when folded thus, to retain them in their intended folded positions. While the machine can be employed for various useful purposes, it has been devised to be especially useful for the purpose of folding shirts, and placing wrappers about the shirts and affixing retaining "stickers" to overlapped parts of the wrappers.

In the accompanying drawings forming a part of this specification,

Fig. 3 is a plan view, on a reduced scale, disclosing a shirt in the machine as when an initial manual folding operation has been completed on said shirt;

Fig. 4 is a plan view, corresponding generally with the disclosure of Fig. 3, showing a shirt as when a later folding operation is being completed;

Fig. 5 is a side elevational view of the disclosure of Fig. 4;

Fig. 6 is a plan view, corresponding generally with the disclosure of Figs. 3 and 4, showing a shirt as when a still later folding operation is being completed;

Fig. 7 is a side elevational view of the disclosure of Fig. 6;

Fig. 8 is a plan view, corresponding generally with the disclosure of Figs. 3, 4 and 6 showing a shirt as when completely folded and being provided with a wrapper;

Fig. 13 is an enlarged sectional view of operative elements of the machine, taken on line 13—13 in Fig. 9;

Fig. 14 is a detail sectional view, taken on line 14—14 in Fig. 13;

Fig. 21 is a detail sectional view, taken on line 21—21 in Fig. 3, parts being omitted;

Fig. 22 is a detail sectional view, taken on line 22—22 in Fig. 4, parts being omitted;

Fig. 23 is an enlarged top plan view of a valve assembly, with cam shaft and drive, of the machine;

Fig. 24 is a detail sectional view, taken on line 24—24 in Fig. 23;

Fig. 25 is an enlarged sectional view of an operating valve, taken on line 25—25 in Fig. 23;

Fig. 26 is an enlarged sectional view of a main operating valve, taken on line 26—26 in Fig. 23;

Fig. 27 is an enlarged fragmentary plan view corresponding generally with the disclosure as in Fig. 1;

Fig. 28 is an enlarged sectional view, taken on line 28—28 in Fig. 7, parts being omitted;

Fig. 29 is a view corresponding generally with the disclosure of Fig. 28, showing operative elements as when a sealing operation has been completed;

Fig. 30 is an enlarged elevational view, partially in section and partially broken away, detailing a sealing mechanism of the machine;

Fig. 31 is a view corresponding generally with the disclosure at the right in Fig. 30, showing parts in different positions;

Fig. 32 is an enlarged sectional view, taken on line 32—32 in Fig. 29, parts being omitted;

Fig. 33 is a plan view of the disclosure of Fig. 31;

Fig. 34 is a view corresponding generally with the disclosure of Fig. 28 detailing parts shown therein;

Fig. 35 is a view of a part of the disclosure of Fig. 31 as it would appear from the reverse side;

Fig. 36 is a detail sectional view, taken on line 36—36 in Fig. 35; and

Fig. 37 is a detail sectional view, taken on line 37—37 in Fig. 35.

A frame 40 of the machine is of a rectilinear configuration and as disclosed includes a horizontal upper wall 41 supported by uprights 42 upon a base member 43 itself supported upon a surface, such, for example, as a floor.

Although a machine incorporating features and characteristics of the invention can be employed to fold and seal various types of articles and materials, as herein illustrated and described the machine incorporates mechanism for accomplishing several different folding operations upon shirts and wrappers therefor, as, for instance, after laundered, and the affixing of retaining "stickers" upon overlapped parts of the wrappers. The horizontal upper wall 41 of the frame 40 has an upper flat surface upon which each shirt to be folded, wrapped and sealed is situated while the folding, wrapping and sealing operations are being performed, and the machine also incorporates mechanism for ejecting each shirt after the folding, wrapping and sealing operations are completed.

Figure 20:
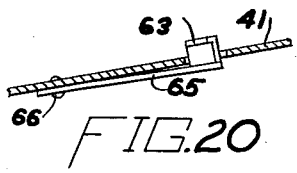
Fig. 20 is a detail sectional view, taken on line 20—20 in Fig. 10.

Speaking generally, each wrapper 44 to be folded is laid upon spaced apart, flexible strips 45 themselves rested upon an intermediate portion 46 of the horizontal upper wall 41 in spaced, parallel relation to its end edges and in spaced perpendicular relation to its side edges. The upper wall 41 is cut away at the opposite ends of the intermediate portion 46 to provide rectilinear openings, indicated 47 and 48, respectively. Each shirt to be folded is laid upon a wrapper with the collar of the shirt loosely fitted on an expander 49 in a concavity 50 contiguous with an intermediate portion of the flat upper surface of the horizontal upper wall 41 and with said expander between the band and fold of the collar, and while the body and arms of the shirt are spread out flat so that the tail extends forwardly and the arms extend toward the opposite sides of the frame, the expander 49 is actuated to be firmly grasped against the inner surface of the fold of the collar, and spaced apart, parallel side retainers 51, 51, extending from rear toward front of the machine at the opposite sides of the shirt in parallel relation thereto, are held down against the shirt while its arms are manually folded, first upwardly and then inwardly, about the side retainers 51, 51, and laid across a rectilinear piece of cardboard 62 upon the shirt with the cuffs in overlapping relation, at the transverse center of the horizontal upper wall 41 in the disclosure as made. The rearward corners of the cardboard 62 are seated against angular stops 63 best shown in Fig. 20. The angular stop 63 are resiliently urged upwardly in apertures 64 in the upper wall 41 by flat springs 65 secured to said upper wall as at 66. When the machine is inoperative the expander 49 is contracted, and the side retainers 51, 51 and a center retainer 56 are in spaced relation to the upper flat surface of the horizontal upper wall 41. After a shirt has been placed in the machine, an operating lever 52, including a foot pedal 53, is depressed and released to cause or permit the expander 49 to be expanded and the side retainers 51, 51 to be swung down against the shirt at the locations where the shirt body and arms meet. After the arms of the shirt are manually folded upwardly and inwardly, and an operating lever 54, including a foot pedal 55, is depressed to cause the center retainer 56, spaced from and parallel with the side retainers 51, to be engaged against the cuffs where they overlap, the remainder of the operations for completing the folding of each shirt and wrapper and for sealing each wrapper upon its corresponding shirt and for ejecting each shirt are performed in response to actuation of an electric motor 57 of the machine. The expander 49, the side retainers 51, 51 and the center retainer 56 are manipulable by mechanisms actuated by said electric motor, as well as by mechanisms under the control of the operating levers 52 and 54, in such manner that said expander is released from the shirt collar and said side retainers 51, 51 and center retainer 56 are withdrawn from the shirt at the appropriate and intended times during the succession of folding operations after the electric motor is energized.

An operation in response to actuation of said electric motor may be the swinging rearwardly of a tail folder, indicated generally at 58, adapted to cause the lower end portion of the shirt to be folded first upwardly and then rearwardly, about the forward ends 59, 59 and 60 of the side retainers and the center retainer, respectively, which forward ends when at their forwardmost position terminate in a single plane disposed rearwardly of the lower end portion or tail of the shirt and extending transversely of the machine and its horizontal upper wall 41, and laid upon the cardboard 62 and the shirt body across the sleeves, desirably so that the tail end of the shirt terminates forwardly of the top or collar end. The tail folder 58 is moved back to its initial position, clear of the shirt, after performing its folding operation, and during return movement of said tail folder to its initial position, the shirt tail is held by clamp elements 61 in its proper folded position.

Each of the side retainers 51, 51 is constituted as a guide device including a guide element 67, which at all times is disposed rearwardly of the shirt in clearing relation thereto, and a more or less flexible strip 68 telescopically arranged in the corresponding guide element 67 and adapted to engage the shirt when the corresponding side retainer 51 is swung downwardly. The center retainer 56 is constituted as a guide device including a guide element 69, also disposed rearwardly of the shirt, and a more or less flexible flat strip 70 telescopically arranged in said guide element 69 and adapted to engage the cuffs of the shirt when said center retainer 56 is swung downwardly. An operation which may be performed after the tail folding operation is removal of the flat strips 68 and 70 from the shirt in response to rearward sliding movement of said flat strips within the guide elements 67 and 69, respectively.

A further operation which may be performed in response to actuation of the electric motor 57 is the projection forwardly and the swinging downwardly of spaced apart, parallel intermediate retainers 71, 71, extending from rear toward front of the machine at the opposite sides of the expander 49 and the center retainer 56, between said center retainer and the side retainers 51, 51, respectively, in spaced, parallel relation to said side retainers and spaced relation to the expander and center retainer, against the shirt body.

Each of the intermediate retainers 71 is constituted as a guide device including a guide element 79, which at all times is disposed rearwardly of the shirt in clearing relation thereto, and a more or less flexible flat strip 80 telescopically arranged in the corresponding guide element 79 and adapted to engage the shirt when the corresponding intermediate retainer 71 is swung downwardly.

A further operation, which may be performed after the intermediate retainers 71, 71 have been engaged down against the shirt, is the swinging upwardly and inwardly of shirt body folders, represented at 72 and 73, respectively, adapted to cause the side marginal portions of the shirt and parts of the sleeves connected therewith to be folded first upwardly and then inwardly, about the intermediate retainers 71, 71, and laid down upon the intermediate portion of the shirt body with one of said side marginal portions in overlying relation to the other. The body folders 72 and 73 operate one after the other and are moved back to their initial positions after performing their folding operations.

Still further operations are the swinging upwardly and inwardly of folders, indicated 74 and 75, respectively, for placing a flexible wrapper, such as 44, upon and about each folded shirt, and for applying a "sticker" to upper overlapping marginal end parts of the wrapper. The horizontal upper wall 41 includes an elongated concavity 76, disposed forwardly of the concavity 50 and extending transversely of the machine, in which flexible wrappers for the shirts are to be placed. One end portion of each wrapper, the right end portion as disclosed, is initially folded upwardly and then inwardly and downwardly upon each folded shirt, simultaneously with the folding of the side marginal portion and sleeve at the corresponding side of the shirt, the other end portion of the wrapper is then folded upwardly, inwardly and downwardly upon the folded shirt with its free marginal end part in overlapped relation to the free marginal end part of the initially folded wrapper end portion, and a "sticker" is applied to the upper overlapping marginal end part of the later folded wrapper end portion and an adjacent surface of the initially folded wrapper end portion thus to retain the wrapper in its folded position upon the shirt. The "stickers" employed to seal the wrappers are constituted as integral parts of a continuous tape 77 upon a roller 78, and the affixing of each "sticker" is preceded by a continuous tape feeding operation and an operation, performed after said feeding operation, removing the "sticker" from the continuous tape. The folding and sealing operations are performed in response to actuation of the electric motor 57.

The folders 74 and 75, situated when inoperative beneath the rectilinear openings 47 and 48, respectively, are assembled with the adjacent ends of the flexible strips 45, 45, and the opposite end portions of said flexible strips cooperate with said folders in the operations of accomplishing the folding of each wrapper. A tape feeding and "sticker" affixing mechanism 81 is associated with the folder 74. Actuation of the electric motor 57 causes the wrapper folder 75 to be operated to accomplish its fold while the shirt body folder 73 is operating, later actuation of said electric motor causes the wrapper folder 74 to be operated to accomplish its fold, actuation of the electric motor upon completion of the fold accomplished by the wrapper folder 74 causes a "sticker" to be removed from the continuous tape and affixed to the wrapper, and actuation of said electric motor causing the wrapper folder 74 and the tape feeding and "sticker" affixing mechanism 81 to be returned from their operative to their inoperative positions also causes said continous tape to be fed ahead one step thus to situate a "sticker," at the forward end of the continuous tape, in position to be removed from said continuous tape and affixed to a wrapper during the next succeeding sealing operation accomplished in the machine.

A wrapper such as 44 will be removed from the elongated concavity 76 and placed in the position in which disclosed in Fig. 6 before each shirt to be folded is placed in the machine.

Operations performed after the "sticker" affixing operation are first, swinging of the intermediate retainers 71, 71 upwardly, rearwardly and finally downwardly, through a sufficient arc to cause said intermediate retainers to be disposed rearwardly of the rear end of the machine and extend rearwardly and horizontally and, second, removal of the flat strips 80 from the shirt in response to sliding movement of said flat strips within the guide elements 79 in direction forwardly of the machine. The outer or adjacent ends of said guide elements 79 will be engaged by any shirt which may have tendency toward moving along with the flat strips 80 as these are made to recede, thus to insure that said flat strips 80 will be withdrawn from each folded, wrapped and sealed shirt to cause it to be ejected from the machine. The intermediate retainers 71 are returned to their normal vertical positions after each shirt emitting operation.

The expander 49 is contracted in response to operation of the electric motor 57 after this causes the shirt body and wrapper folders to be operative and before the shirt is lifted from the horizontal upper wall 41. Once contracted, said expander remains contracted until caused or permitted to be expanded in response to depression and release of the operating lever 52. The side retainers 51, 51 and the center retainer 56 are moved to normal positions, clear of a shirt, during completion of operation of the electric motor 57 and ejection of each shirt from the machine. The flat strips 68 of said side retainers remain clear of a shirt until caused or permitted to be engaged thereagainst in response to depression and release of said operating lever 52, and the flat strip 70 of said center retainer remains clear of shirt until caused or permitted to engage the shirt cuffs in response to depression and release of the operating lever 54.

Side walls 82, housing a valve assembly 83 disclosed very clearly in Figs. 1, 2, 23, 24, 25 and 26, rotatably support a horizontal shaft 84 which extends transversely of the machine and fixedly carries spaced camming elements for purposes to be described. The electric motor 57 is suitably and conveniently supported upon one of the side walls 82, and a driven shaft of said electric motor fixedly supports a pinion 85 which meshes with a gear 86 fixed upon the horizontal shaft 84.

On intermediate portion of the operating lever 52 is rotatably supported, as at 87, upon the base member 43 of the frame, and a rearward arm of said operating lever 52 is pivotally connected, as at 88, to a link 376 which is connected as at 432 to a first triangular piece 89 itself pivoted on the frame, as at 90. An upwardly extending release bar 91 has its lower end pivotally connected, as at 92, to a part of the first triangular piece 89 at the side of the pivotal support 90 opposite the pivotal connection 88. The upper end of the release bar 91 fixedly supports a release element 93. A second triangular piece 94, pivoted on the frame, as at 95, is pivotally connected, as at 96, to an L-shape member 97 having a lower portion thereof slidably disposed in the release element 93. The lower end of the L-shape member 97 fixedly supports a latch element 98 situated beneath the release element 93. An actuator bar 99 has its lower end pivotally connected, as at 100, to a part of the second triangular piece 94 at the side of the pivotal support 95 opposite the pivotal connection 96. The upper end of the actuator bar 99 is pivotally connected, as at 101, to an apex of a third triangular piece 102 itself pivoted on the frame, as at 103. An apex of the third triangular piece 102 at the side of the pivotal support 103 opposite the pivotal connection 101 is pivotally connected, as at 104, to one end of an actuator rod 105 having its opposite end pivoted, as at 106, to a rearward piece 107 of the expander 49. The construction and arrangement are such that a tension coil spring 108 normally retains rearward and forward pieces of the collar expander in spread apart relation. A tension coil spring 109 normally retains the operating lever 52 in its normal elevated position. A keeper 110 for the latch element 98 is pivotally supported, as at 111, on the frame. The construction and arrangement are such that the latch element 98 can be depressed, in response to actuation of the electric motor 57, in a manner to be made clear, while the operating levers 52 and 54 are stationary, and become locked back of and beneath the keeper 110, thus to contract the collar expander 49 and retain it in contracted condition, and also such that the operating lever 52 can be depressed thus to cause the release element 93 to remove said keeper 110 from engaged relation with said latch element 98 and released to permit the tension coil spring 109 to return the operating lever to its normal elevated position while the tension coil spring 108 returns the collar expander 49 to its expanded condition with said release element 93 and the latch element 98 in engagement to cause the keeper 110 to be held clear of said latch element while the latter moves upwardly past and clear of said keeper.

The guide element 67 of the guide device of each side retainer 51 is constituted as a channel member having a first rearward corner thereof rotatably supported, as at 112, for swinging movement in a vertical plane longitudinally of the machine upon an apex or corner of a triangular channel piece 113 of each side retainer itself rotatably mounted, as at 114, upon the machine frame for vertical swinging movement in the plane of said guide element 67. A second rearward corner of each guide element 67 is pivotally connected, as at 115, to an end portion of a link 116, constituted as a channel piece, having its opposite end portion pivotally supported, as at 117, upon said machine frame for swinging movement in a vertical plane longitudinally of the machine. The flat strip 68 of each side retainer 51 is guidably supported by and between spaced, oppositely disposed guide rollers 118 suitably and conveniently mounted upon the corresponding guide element 67, as well as by spaced, oppositely disposed guide rollers 119 suitably and conveniently mounted on the machine frame. The sets of guide rollers 118 are in spaced relation longitudinally of the guide elements 67 and the sets of guide rollers 119 are in vertically spaced relation. A portion of each flat strip 68 between the corresponding guide rollers 118 and 119 passes between a pair of guide rollers 120 upon a lever 121 and at one side of the flat strip and a guide roller 122 upon said lever, and at the other side of said flat strip. Each lever 121 is pivotally supported, as at 123, upon the machine frame for vertical and longitudinal swinging movement, and an extension upon a shaft 124 supporting each guide roller 122 is disposed in a longitudinal slot 125 in the corresponding link 116.

The construction and arrangement are such that when the triangular channel pieces 113 are rotated on their pivotal supports 114 in one direction, the guide devices of the side retainers 51 will cause their guide elements 67 to be swung upwardly, and when said triangular channel pieces 113 are rotated in opposite direction, said guide devices will cause their guide elements to be swung downwardly.

Figure 15:
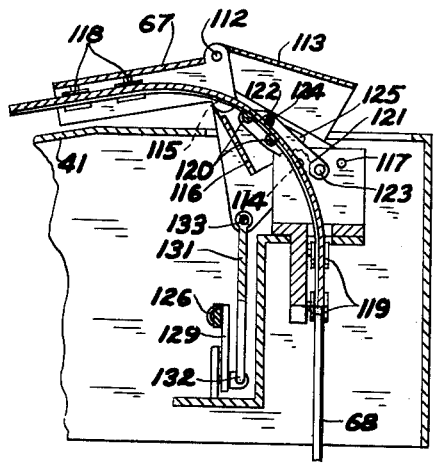
Fig. 15 is a detail sectional view, taken on line 15—15 in Fig. 13.

As hereinbefore stated, the flat strips 68 of the side retainers 51, 51 are moved to positions clear of the shirt on completion of the tail folding operation, and said side retainers remain clear of a shirt until caused or permitted to be engaged thereagainst in response to depression and release of the operating lever 52. The guide elements 67 are moved to upwardly swung positions and there held thus to cause forward portions of the flat strips 68 to be clear of shirt, through the instrumentality of the latch element 98 and the keeper 110 when these are interengaged. A horizontal bar 126 having its intermediate portion rotatably connected, as at 127, to a portion of the second triangular piece 94 opposite its pivotal support 95 and between and spaced from the pivotal connections 96 and 100, has each of its opposite ends pivotally connected, as at 128, to a first apex of a triangular link 129 having a second apex thereof pivotally supported, as at 130, upon the machine frame. A link 131 having its lower end pivotally connected, as at 132, to a third apex, spaced from the pivotal connection 128 and the pivotal support 130, of each triangular link 129, has its upper end pivotally connected, as at 133, to an apex or corner of the corresponding triangular channel piece 113 spaced from the apex or corner of said corresponding triangular channel piece pivotally connected to the corresponding guide element 67, as well as spaced from the pivotal support 114 for the corresponding triangular channel piece. Assuming the latch element 98 to be locked down by the keeper 110, thus to cause the horizontal bar 126 to be held toward the right in Fig. 13, against resilient action of a tension coil spring 134 having one of its ends secured, as at 135, to said horizontal bar and its other end connected, as at 136, to the machine frame, and also to cause the guide elements 67 of the side retainers 51 and the forward portions of the flat strips 68 retained by said guide elements to be held in an upwardly swung position, upon release of said latch element 98 from said keeper 110 in response to depression and release of the operating lever 52, in the manner hereinbefore set forth, the horizontal bar 126 will be moved by the tension coil spring 134 toward the left in said Fig. 13 and cause the triangular links 129 to be swung in counterclockwise direction on their pivotal supports 130 thus to cause the links 131 to be moved downwardly and the guide elements 67 with the contained flat strips 68 to be swung downwardly, in counterclockwise direction in Fig. 15, so that said flat strips 68 become engaged against a shirt when upon the horizontal upper wall 47.

An intermediate portion of the operating lever 54 is rotatably supported, as at 137, upon the base member 43 of the frame, and a rearward arm of said operating lever 54 is pivotally connected, as at 138, to a link 350 which is connected as at 363 to a fourth triangular piece 139 itself pivoted on the frame, as at 140. An upwardly extending release bar 141 has its lower end pivotally connected, as at 142, to a part of the fourth triangular piece 139 at the side of the pivotal support 140 opposite the pivotal connection 138. The upper end of the release bar 141 fixedly supports a release element 143. A fifth triangular piece 144, pivoted on the frame, as at 145, is pivotally connected, as at 146, to an L-shaped member 147 having a lower portion thereof slidably disposed in the release element 143. The lower end of the L-shape member 147 fixedly supports a latch element 148 situated beneath the release element 143. A link 149 has its lower end pivotally connected, as at 150, to a part of the fifth triangular piece 144 at the side of the pivotal support 145 opposite the pivotal connection 146. The upper end of the link 149 is pivotally connected, as at 151, to a triangular channel piece 152, equivalent to each of the triangular channel pieces 113 and for the same purpose, of the center retainer 56. The guide element 69 of the guide device of said center retainer 56 is constituted as a channel member rotatably supported upon the triangular channel piece 152 in substantially the same manner each guide element 67 is rotatably supported upon its corresponding triangular channel piece 113. The center retainer 56 includes a link 153, equivalent to the link 116 of each side retainer 51 and for the same purpose, having one of its end portions pivotally connected to the guide element 69 and its other end portion pivotally mounted on the machine frame. The flat strip 70 of the center retainer is guidably supported in substantially the same manner as are the flat strips 68 of the side retainers 51.

The construction and arrangement are such that when the triangular channel piece 152 is rotated on its pivotal support in one direction, the guide device of the center retainer 56 will cause the guide element 69 to be swung upwardly, and when said triangular channel piece 152 is rotated in opposite direction, said guide device will cause said guide element 69 to be swung downwardly.

Figure 17:
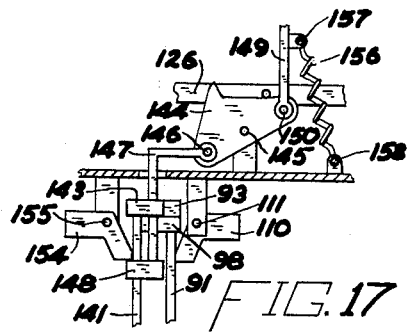
Fig. 17 is a detail sectional view, taken on line 17—17 in Fig. 14.
Figure 18:
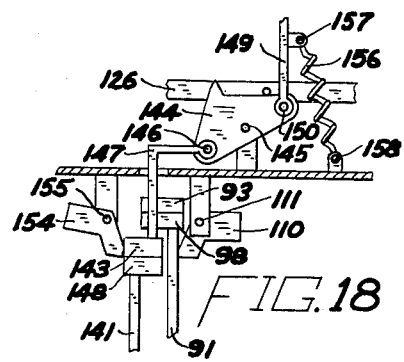
Fig. 18 is a view corresponding generally with the disclosure of Fig. 17, showing parts in different positions.

The flat strip 70 of the center retainer 56 is moved to position clear of a shirt upon completion of the tail folding operation at the same time the flat strips 68 of the side retainers 51 are moved clear of the shirt, and said center retainer remains clear of a shirt until caused or permitted to be engaged against cuffs of the shirt in response to depression and release of the operating lever 54. A keeper 154 for the latch element 148 is pivotally supported, as at 155, on the frame. The construction and arrangement are such that the latch element 148 can be depressed, in response to actuation of the electric motor 57, while the operating levers 52 and 54 are stationary, and become locked back of and beneath the keeper 154, thus to cause the center retainer 56 to be moved to position clear of the shirt. The guide element 69 is held in upwardly swung position, thus to cause a forward portion of the flat strip 70 to be clear of a shirt, through the instrumentality of the latch element 148 and the keeper 154 when these are interengaged. A tension coil spring 156, having one of its ends connected, as at 157, to the link 149, and its other end connected, as at 158, to the machine frame, tends to urge the link 149 downwardly thus to cause the guide element 69 and the forward portion of the flat strip 70 to be swung downwardly. Assuming the latch element 148 to be locked down by the keeper 154, in the manner as set forth in connection with the latch element 98 and the keeper 110, thus to cause the fifth triangular element 144 to be held in counterclockwise rotated position, as in Figs. 17 and 18, against resilient action of the tension coil spring 156, and also to cause the guide element 69 and the forward portion of the flat strip 70 to be held in an upwardly swung position, upon release of the latch element 148 from said keeper 154 in response to depression and release of the operating lever 54, causing the release element 143 to remove the keeper 154 from engaged relation with the latch element 148 and permit the tension coil spring 159 to return the operating lever 54 to its normal elevated position while the tension coil spring 156 returns the link 149 to its normal position with said release element 143 and the latch element 148 in engagement to cause the keeper 154 to be held clear of said latch element 148 while the latter moves upwardly past and clear of said keeper, the guide element 69 and the portion of the flat strip 70 contained thereby will be swung downwardly thus to cause the forward portion of said flat strip to be engaged against cuffs of a shirt.

The whole of the work of an operator of the machine is to position a shirt on the horizontal upper wall 41 with the collar of the shirt associated with the expander 49 while contracted and the sleeves of the shirt situated as hereinbefore set forth, press down on and release the foot pedal 53 to cause or permit the expander to be expanded and the side retainers 51 to be swung down against the shirt, manually fold the shirt arms upwardly and inwardly, and press down on and release the foot pedal 55 to cause or permit the center retainer 56 to be swung down against the cuffs of the shirt. Thereafter, the folding, wrapping and sealing operations on each shirt, and the emitting operation, are performed in response to actuation of the electric motor 57.

The guide element 79 of the guide device of each intermediate retainer 71 is constituted as a channel member having a first inner corner thereof rotatably supported, as at 160, for swinging movement in a vertical plane longitudinally of the machine, upon an apex or corner of a triangular channel piece 161, equivalent to the triangular channel pieces 113 and 152, of each intermediate retainer itself rotatably supported, as at 162, upon the machine frame for vertical swinging movement in the plane of said guide element 79. A second inner corner of each guide element 79 is pivotally connected, as at 163, to an end portion of a link 164, constituted as a channel piece, having its opposite end portion pivotally supported, as at 165, upon said machine frame for swinging movement in a vertical plane longitudinally of the machine. The flat strip 80 of each intermediate retainer 71 is guidably supported by and between spaced, oppositely disposed guide rollers 166 suitably and conveniently mounted upon the corresponding guide element 79, as well as by spaced, oppositely disposed guide rollers 167 suitably and conveniently mounted on the machine frame. The sets of guide rollers 166 are in spaced relation longitudinally of the guide elements 79 and the sets of guide rollers 167 are in vertically spaced relation. A portion of each flat strip 80 between the corresponding guide rollers 166 and 167 passes between a pair of guide rollers 168 upon a lever 169 and at one side of the flat strip and a guide roller 170 upon said lever 169 and at the other side of said flat strip. Each lever 169 is pivotally supported, as at 171, upon the machine frame for vertical and longitudinal swinging movement, and an extension upon a shaft 172 supporting each guide roller 170 is disposed in a longitudinal slot 173 in the corresponding link 164.

Figure 16:
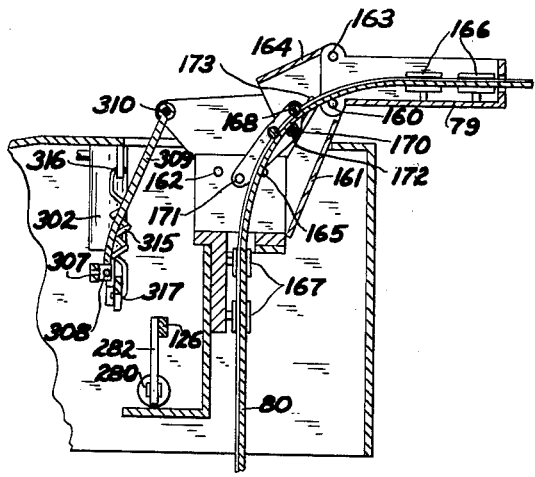
Fig. 16 is a detail sectional view, taken on line 16—16 in Fig. 13.

The construction and arrangement are such that when the triangular channel pieces 161 are rotated on their pivotal supports 162 in one direction, the guide devices of the intermediate retainers 71 will cause their guide elements 79 to be swung upwardly, rearwardly and downwardly, to position as in Fig. 16, and when said triangular channel pieces 161 are rotated in opposite direction, said guide devices will cause their guide elements to be swung from a position in said Fig. 16 upwardly, forwardly and downwardly.

Incoming wires from a source (not shown) of electrical energy are denoted 174 and 175. The incoming wire 174 is connected to the electric motor 57, a lead wire 176 extends from said electric motor to a so-called tail folder switch 177, a lead wire 178 extends from the switch 177 to a cam box switch 179, and a lead wire 180 extends from the switch 179 to a movable contact element 182 conductively connected to the incoming wire 175. A lead wire 183 is connected to the lead wire 178 and adapted to be connected to the incoming wire 175 through the instrumentality of a starter switch 184 when the main switch is closed, thus to close a circuit for the electric motor.

The tail folder 58 is of U-shape. It includes a base 185, disposed transversely of the machine and normally resting upon a forward portion of the upper surface of the horizontal wall 41, and downwardly extending arms 186, 186 which are situated in elongated slots 187, 187 in and at the opposite sides of said wall 41 and extending longitudinally of the machine. The arms 186 are slidably mounted in tubular elements, denoted 188 and 189, respectively, at opposite sides of the machine. Intermediate portions of the tubular elements 188 and 189 are rigid with the opposite ends of a transverse rod 190. A lever 191 rigid with the tubular element 188 and the transverse rod 190, at the corresponding side of the frame, has its rearward end portion rotatably supported, as at 192, upon said frame, and a lever 193 rigid with the tubular element 189 and said transverse rod 190, at the corresponding side of the frame, has its rearward end portion rotatably supported, as at 194, upon said frame. The levers 191 and 193 are in alinement transversely of the machine, and a forward extension 195 upon said lever 193 has its forward end pivotally connected, as at 196, to the upper end of a connecting rod 197 rigid with a piston 200 in a cylinder 198 pivotally supported upon the machine frame, as at 199.

The lower ends of the downwardly extending arms 186 support rollers 201 which ride upon upwardly facing camming surfaces 202 provided by cams 203 rigid with lower portions of the machine frame at opposite sides thereof.

Provision is included for applying fluid under pressure to the lower surface of the piston 200 to cause it to be moved outwardly of the cylinder 198 and the connecting rod 197 to be moved upwardly, thus to cause the lever 193 to be swung upwardly on its pivotal support 194, and also for applying fluid under pressure to the upper surface of said piston to cause it to be moved inwardly of said cylinder 198 and said connecting rod 197 to be moved downwardly, thus to cause said lever 193 to be swung downwardly on its pivotal support.

Figure 19:
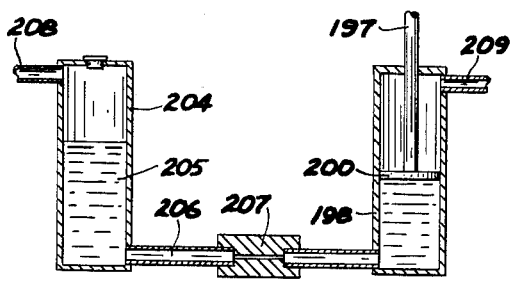
Fig. 19 is a detail sectional view disclosing a damping device of the machine.

A damping device for the piston 200 is very clearly disclosed in Fig. 19. An auxiliary cylinder 204 contains oil 205, also contained in the lower end portion of the cylinder 198, beneath the piston 200, and a pipe 206 with flow reducer 207 connects lower portions of the auxiliary cylinder 204 and the cylinder 198. A pipe connection in an upper part of the auxiliary cylinder 204 is denoted 208, and a pipe connection in an upper part of the cylinder 198 is indicated 209.

Fluid for operating the piston 200 is provided from a source (not shown) of fluid under pressure by way of a main operating valve 210, disclosed very clearly in Figs. 23 and 26, and an operating valve 211 for the tail folder, shown very clearly in Figs. 23 and 25.

A main supply pipe 212 leads from a source of fluid under pressure to the interior of a hollow casing 213 of the main operating valve 210, and an exhaust pipe 214, in longitudinally spaced relation to the main supply pipe 212, leads from the interior of said hollow casing 213. A supply pipe 215 leads from the interior of the hollow casing 213 to a manifold 216 which is open to a supply pipe 217 leading to the interior of a hollow casing 218 of the operating valve 211. The supply pipe 215 is at the side of the hollow casing 213 opposite the main supply pipe 212 and the exhaust pipe 214, as well as situated between said pipes 212 and 214 longitudinally of the hollow casing 213. A supply pipe 219 leads from the interior of the hollow casing 218 to the pipe connection 208, and a supply pipe 220 leads from the interior of said hollow casing 218 to the connection 209. The supply pipe 217 is at the side of the hollow casing 218 opposite the pipes 219 and 220, as well as situated between said pipes 219 and 220 longitudinally of the hollow casing 218.

A cylindrical valve element 221, mounted in the hollow casing 213 of the main operating valve 210 for longitudinal sliding movement, supports three longitudinally spaced O-rings, each designated 222. A compression coil spring 223 normally retains the cylindrical valve element 221 situated so that the main supply pipe 212 is shut off from the supply pipe 215 and the manifold 216. A camming element 224 upon the horizontal shaft 84 of the valve assembly is for actuating a plunger 225 rigid with the cylindrical valve element 221 to cause said valve element to be longitudinally moved, toward the right in Fig. 26, to establish communication between the main supply pipe 212 and the supply pipe 215. Communication between the main supply pipe 212 and the supply pipe 215 of course is by way of the annular space between O-rings 222 and surrounding the valve element 221. The construction and arrangement will be such that the camming element 224 will situate a pivotally supported arm 252 to retain the valve element 221 in position to cause the main supply pipe 212 and the supply pipe 215 to be interconnected at all times while the machine is operative, and that the compression coil spring 223 will retain said valve element in position to cause fluid under pressure to be shut off from the manifold 216 at all times while the machine is inoperative.

A cylindrical valve element 226, mounted in the hollow casing 218 of the operating valve 211 for longitudinal sliding movement, supports three longitudinally spaced O-rings, each represented 227. A compression coil spring 228 normally retains the cylindrical valve element 226 situated so that the supply pipe 217 is shut off from the pipe 219 and connected with the pipe 220. A camming element 229 upon the horizontal shaft 84 of the valve assembly is for engagement with a pivotally supported arm 253 for actuating a plunger 230 rigid with the cylindrical valve element 226 to cause it to be longitudinally moved, toward the left in Fig. 25, to establish communication between the pipes 217 and 219, and shut off communication between the pipes 217 and 220. Communication between the pipes 217, 219 and 217, 220, respectively, is by way of annular spaces between O-rings 227 and surrounding the valve element 226. The camming element 229 will be operative after the electric motor 57 is set in operation to cause the valve element 226 to be moved longitudinally, thus to cause the piston 200 to be elevated and the tail folder 58 to perform its intended service. Elevation of the piston 200 with connecting rod 197 causes the levers 191, 193, and parts connected thereto, to be swung upwardly. The tubular elements 188 and 189 will swing forwardly and upwardly in response to upward swinging of the levers 191 and 193, and, as a consequence, the tail folder will be moved from its position as in Fig. 21 to its position as in Fig. 22. The construction and arrangement are such that the base 185 of the tail folder, together with the downwardly extending arms 186, will be moved upwardly upon commencement of operation of said tail folder, with travel of the rollers 201 over the camming surfaces 202, and then allowed to move downwardly to complete the tail folding operation. The levers 191, 193 rotate through a substantial arc, and the base 185 of the tail folder is moved upwardly by reason of travel of the rollers 201 over the camming surfaces 202, from rear toward front of the machine.

The shirt tail is engaged by the clamp elements 61 upon completion of the folding operation performed by the tail folder, and said clamp elements retain said shirt tail in proper folder position during return movement of said tail folder.

Each clamp element 61 includes a lever, pivoted on the frame, as at 231, having a longer arm 232 thereof, situated above the upper wall 41, extending generally forwardly and upwardly and rigidly supporting a grip piece 233 at its forward end, and a shorter arm 234 thereof, situated below said upper wall 41, extending downwardly and having its lower end rigidly supported upon a transverse shaft 235. A tension coil spring 236 has its forward end connected, as at 237, to the transverse shaft 235, and its rearward end connected, as at 238, to the machine frame.

A triangular piece 239 has an upper apex thereof pivotally supported, as at 240, upon the frame for rotatable movement in a vertical plane longitudinally of the machine. A pin supported upon the triangular piece 239 at a lower apex thereof is denoted 241, and a pin supported upon said triangular piece at a forward, intermediate portion thereof, between and in spaced relation to the pivotal support 240 and the pin 241, is indicated 242.

A pin 243, on the machine frame and clear of the triangular piece 239, is situated in a longitudinal slot 244 in an intermediate portion of a latch bar 245 having its rearward end rotatably connected to the transverse shaft 235 and its forward end provided with a hook 246.

A release bar 247, having its lower end rigidly secured to the transverse rod 190, pivotally supports, as at 248, a release lever including a short arm 249 above the pivotal support and a long arm 250 below said pivotal support and normally resting by gravity against a boss 251 rigid with the release bar 247.

A latch device 254, pivoted, as at 255, upon a side wall 82 housing the valve assembly 83, includes a notched outer end 256 for engagement back of an upper portion of the pivotally supported arm 253 when this is retained in position by the camming element 229 to cause the valve element 226 to be positioned toward the right in Fig. 25, against force of the compression coil spring 228, and the supply pipes 217 and 219 to be in communication.

A first link 257 has its lower, rearward end pivotally connected, as at 258, to an intermediate portion of the latch device 254, and its upper, forward end pivotally connected, as at 259, to the lower, forward end of a second link 260 having its upper rearward end pivotally connected, as at 261, to a portion of the release bar 247 above the transverse rod 190. The second link 260 is situated rearwardly of said transverse rod 190, and the pivotal connection 259 between the first and second links 257 and 260 is below the elevation of the transverse rod.

A cam for opening the tail folder switch 177, to cause the electric motor 57 to become deenergized, is represented at 262. Said cam 262 is rigid with the transverse rod 190, and a rearward portion of said cam includes a camming surface 264 for actuating a movable contact element of the tail folder switch 177 to open position.

The construction and arrangement will be such that when the machine is inoperative, the clamp elements 61 and the actuating devices therefor will be situated as in Fig. 21, of the drawings. In said Fig. 21, the notched outer end 256 of the latch device 264 is resting upon the upper end of the pivotally supported arm 253, and the hook 246 is held at its farthest forward position by the release bar 247, thus to retain the longer arms 232 in upstanding position, with the grip pieces 233 at their farthest distance from the horizontal upper wall 41, against resilient force of the tension coil spring 236. With rearward swinging movement of the tail folder 58, in response to forced upward movement of the piston 200, there will be rearward swinging movement of the release bar 247 away from the hook 246. With removal of said release bar from said hook, the tension coil spring 236 will pull the latch bar 245 rearwardly until the pin 242 on the triangular piece 239 falls into a notch 265 in the upper edge of said latch bar, thus to preclude further rearward movement of the latch bar. In Fig. 22, said latch bar is shown as when released by the bar 247, the pin 243 is at an intermediate location in the longitudinal slot 244, and the longer arms 232 of the clamp element levers are held by the tension coil spring 236 to situate the grip pieces 233 closer to the upper wall 41 than said grip pieces are situated in Fig. 21. The camming element 229 will actuate the pivotally supported arm 253 to the right in Fig. 24 before the tail folder 58 commences its swing toward the right in said Fig. 21, and upon movement of said pivotally supported arm toward the right, the notched outer end 256 of the latch device 254 will fall by gravity to position back of said pivotally supported arm, thus to lock the cylindrical valve element 226 in position, against resilient force of the compression coil spring 228, retaining the supply pipe 217 in communication with the pipe 219. During rearward swinging movement of the tail folder 58, with the transverse rod 190 and appurtenances as a unit, after the notched outer end 256 of the latch device 254 has become engaged back of the pivotally supported arm 253, the cam 262 will rotate in clockwise direction, from position as in Fig. 21 toward position as in Fig. 22, to cause the tail folder switch 177 to be opened, thus to break the circuit for and cause the electric motor 57 to come to rest and cease advancement of the horizontal shaft 84.

With swinging movement of the release bar 247 toward the limit of its rearward position, the short arm 249 of the release lever will engage the pin 241 thus to cause the long arm 250 of said release lever to be swung upwardly and permit said short arm 249 to be rotated counterclockwise to extent to be moved past said pin 241, from left to right thereof in Figs. 21 and 22. The construction and arrangement will be such that the second link 260 will become engaged with the transverse rod 190 upon further rearward swinging movement of the release bar 247 after the short arm 249 of the release lever has become situated at the side of the pin 241 opposite the hook 246, the right side of said pin 241 in Fig. 22, to cause the first link 257 to be moved longitudinally rearwardly to swing the latch device upwardly and release it from the pivotally supported arm 253. The compression coil spring 228 will act upon release of the plunger 230 to establish communication between the supply pipe 217 and the pipe 220, as in Fig. 25, and shut off communication between said supply pipe 217 and the pipe 219.

Upon establishment of communication between the supply pipe 217 and said pipe 220, the piston 200 will become forced inwardly to cause the tail folder 58 to be returned from its position as in Fig. 22 to its position as in Fig. 21. Upon forward swinging movement of the release bar 247 from its position as in said Fig. 22, where the short arm 249 of the release lever is engaged against the right side of the pin 241 and the long arm 250 of said release lever is engaged against the boss 251, said short arm will exert a push toward the left against said pin 241 and cause it to be moved clear of the short arm, thus to cause the triangular piece 239 to be swung forwardly and the pin 242 to be removed from the notch 265. Immediately upon removal of said pin 242 from said notch 265, the tension coil spring 236 will act to cause the longer arms 232 of the clamp levers to be swung downwardly and the grip pieces 233 upon said longer arms to be engaged against the shirt tail, as in Figs. 4 and 5 of the drawings. Said grip pieces 233 will remain engaged against the shirt tail during substantially the whole of the return of the tail folder to its normal, inoperative position, until the release bar 247 during its swing toward its farthermost forward position engages the hook 246 and causes the latch bar 245 to be moved longitudinally forwardly, against resilient force of the tension coil spring 236, thus to cause the grip pieces 233 to be moved from position where engaged against a shirt tail, as in said Figs. 4 and 5, to position where farthermost from the horizontal upper wall 41, as in Fig. 21. Upon forward swinging movement of the transverse rod 190, with the first and second links 257 and 260 as a unit, the latch device 254 will be permitted to become depressed by gravity to rest upon the upper end of the pivotally supported arm 253, as in said Fig. 21. With return of the tail folder 58 and associated parts to normal, inoperative position, the cam 262 will be actuated to remove its camming surface 264 from engagement with the tail folder switch 177, thus to permit said switch to close and the circuit for the electric motor 57 to be made.

The electric motor 57 is operative to remove the flat strips 68 and 70 of the side retainers 51 and the center retainer 56, respectively, from each shirt upon completion of the tail folding operation in response to rearward sliding movement of the flat strips in the guide rollers on the guide elements 67 and 69, respectively, and downward sliding movement of said flat strips in the corresponding guide rollers on the frame.

A vertical cylinder 266 rigid with the machine frame houses a piston 267 rigid with a connecting rod 268 extending downwardly from said vertical cylinder 266 and having its lower end rigidly connected, as at 269, with a transverse member 270 fixedly carrying first and second tubular elements, indicated 271 and 272, respectively, situated at the opposite ends of said transverse member 270 and slidably mounted on vertical guides, represented 273 and 274, respectively, rigid with the machine frame. A coil spring 275 on the lower end of the guide 273 constitutes a resilient element or cushion for limiting the extent of downward movement of the tubular element 271, as well as of the transverse member 270. The lower, rearward ends of the flat strips 68 and 70 are secured, as at 276, to the transverse member 270.

Air under pressure for operating the piston 267 is provided from the source of air under pressure by way of the main operating valve 210, the manifold 216 and an operating valve 277, equivalent to the operating valve 211 for the tail folder. A camming element 278 upon the horizontal shaft 84 of the valve assembly is for engagement with a pivotally supported arm 279 for actuating a plunger rigid with a cylindrical valve element, equivalent to the valve element 226, of the operating valve 277 to cause communication to be established between the manifold 216 and the upper portion of the vertical cylinder 266, above the piston 267, and shut off communication between said manifold and the lower portion of said cylinder 266, below said piston 267. The camming element 278 will be operative after the tail folding operation is completed to cause the piston 267 to be depressed and the flat strips 68 and 70 to be withdrawn from the shirt. The construction and arrangement will be such that the camming element 278 will cause the flat strips 68 and 70 of the side retainers and the center retainer, respectively, to be held in their rearwardly and downwardly slid position until the folding, wrapping and sealing operations are completed, and said camming element 278 will cause said flat strips 68 and 70 to be slid upwardly and forwardly upon completion of the ejecting operation.

The guide elements 67 of the side retainers 51 and the guide element 69 of the center retainer 56 will be swung upwardly prior to commencement of actuation of the intermediate retainers 71, in a manner to be described, in the operation of emitting each folded, wrapped and sealed shirt from the machine.

A horizontal cylinder 280 fixed upon the machine frame houses a piston (not shown) rigid with a connecting rod 281 secured to the horizontal bar 126 through the medium of a vertical piece 282.

Air under pressure for operating the piston in the horizontal cylinder 280 is provided from the manifold 216 by way of an operating valve 283, for the same general purpose as are the operating valves 211 and 277. A camming element 284 upon the horizontal shaft 84 is for engagement with a pivotally supported arm 285 for actuating a plunger rigid with a cylindrical valve element, for the same general purpose as is the valve element 226, of the operating valve 283 to cause communication to be established between the manifold 216 and the inner end, at the left in Fig. 13, of the horizontal cylinder 280, beneath the piston in said cylinder. Actuation of the connecting rod 281 toward the right in said Fig. 13 will cause the horizontal bar 126 to be moved toward the right, the triangular links 129 and the triangular pieces 94 and 144 to be rotated clockwise, and the links 131, 149 and the triangular channel pieces 113, 152 to be rotated in clockwise direction in Fig. 15, thus to cause the guide element 67 and 69 to be swung upwardly and the L-shaped members 97 and 147 to be swung downwardly so that the latch elements 98 and 148 become locked back of the keepers 110 and 154, respectively. Upon release of the pivotally supported arm 285 by the camming element 284, a compression coil spring (not shown), equivalent to the compression coil springs 223 and 228, for the cylindrical valve element of the operating valve 283 will return said cylindrical valve element to its normal position where the manifold 216 is shut off from communication with the horizontal cylinder 280. The L-shaped members 97 and 147 will be retained in depressed position, against resilient force of the tension coil spring 134, by reason of engagement of the latch elements 98 and 148 back of the keepers 110 and 154, respectively, until said latch elements are released in response to depression of the operating levers 52 and 54 after another shirt to be folded, wrapped and sealed has been placed in the machine. As hereinbefore set forth, the collar expander 49 will become expanded and the flat strips 68 of the side retainers 51 will be swung down against the shirt in response to depression and release of the operating lever 52 causing the latch element 148 to be released from the keeper 154.

Attention is called to the fact that should it for any reason be desired to swing the guide elements 67 and 69 and forward portions of the flat strips 68 and 70 upwardly and cause the expander 49 to be contracted after the latch elements have been released from the keepers in response to depression of the operating levers 52 and 54, this can be accomplished by depressing said operating levers a second time.

In the disclosure as made, the shirt tail is folded about the forward ends 286, 286 of the flat strips 80, 80 of the intermediate retainers 71, 71 as well as about the forward ends 59, 59, 60 of the flat strips 68, 68 and 70 of the side retainers 51, 51 and the center retainer 56, which forward ends 286, 286 when at their forwardmost position terminate in the plane of said forward ends 59, 59, 60. Before commencement of the tail folding operation, the flat strips 80, 80 are extended in response to forward sliding movement in the guide rollers on the guide elements 79 and upward sliding movement in the corresponding guide rollers on the machine frame, from the normal position of said flat strips, as in Figs. 1 and 2, to positions where capable of being swung down against a shirt, are withdrawn from the shirt upon completion of the tail folding operation in response to rearward sliding movement in the guide rollers on said guide elements 79 and downward sliding movement in the corresponding guide rollers on the machine frame, are then projected forwardly to position where capable of being swung down against the body of the shirt so that side marginal portions of said shirt body can be swung upwardly and inwardly by the folders 72 and 73 about said flat strips, and are withdrawn from the shirt upon completion of the folding, wrapping and sealing operations, during the operation of ejecting of the shirt.

A vertical cylinder 287 rigid with the machine frame houses a piston 288 rigid with a connecting rod 289 extending downwardly from said vertical cylinder 287 and having its lower end rigidly connected, as at 290, with a transverse member 291 fixedly carrying first and second tubular elements, represented 292 and 293, respectively, situated at the opposite ends of said transverse member 291 and slidably mounted on vertical guides, designated 294 and 295, respectively, rigid with the machine frame. A coil spring 296 on the lower end of the guide 294 constitutes a resilient element or cushion for limiting the extent of downward movement of the tubular element 292, and, hence, of the transverse member 291. The lower ends of the flat strips 80, 80 are secured, as at 297, to the transverse member 291.

Air under pressure for operating the piston 288 is provided from the manifold 216 by way of an operating valve 298, equivalent to the operating valves 211 and 277. A camming element 299 upon the horizontal shaft 84 is for engagement with a pivotally supported arm 300 for actuating a plunger rigid with a cylindrical valve element, equivalent to the valve element 226, of the operating valve 298 to cause communication to be established between the manifold 216 and the upper portion of the vertical cylinder 287, above the piston 288, and shut off communication between said manifold and the lower portion of said cylinder 287, below said piston. The camming element 299 will be situated to cause the piston 288 to be elevated and the flat strips 80 to be projected before the tail folding operation is commenced, will be operative to cause said piston to be depressed and said flat strips to be withdrawn from the shirt after the tail folding operation is completed, will be situated to cause said piston to be elevated and said flat strips to be slid forwardly to be positioned to be capable of engaging the shirt in response to downward swinging movement of the guide elements 79, in a manner to be set forth, after the flat strips are withdrawn from the shirt following completion of the tail folding operation and before the shirt body folders are operative, and will be operative to cause said pistons to be depressed and said flat strips to be withdrawn from the shirt upon completion of the folding, wrapping and sealing operations, during the shirt ejecting operation.

Figure 1:
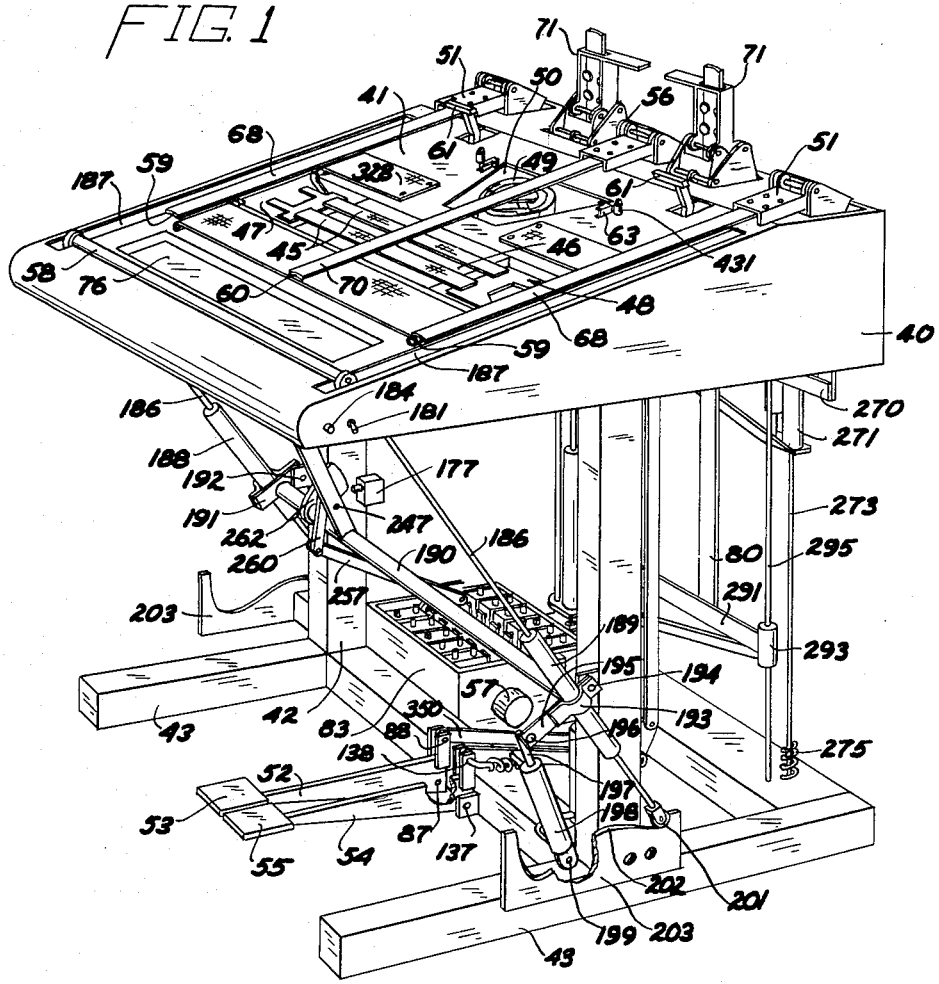
Fig. 1 is a front perspective view of a machine for folding and sealing made according to the invention.
Figure 2:
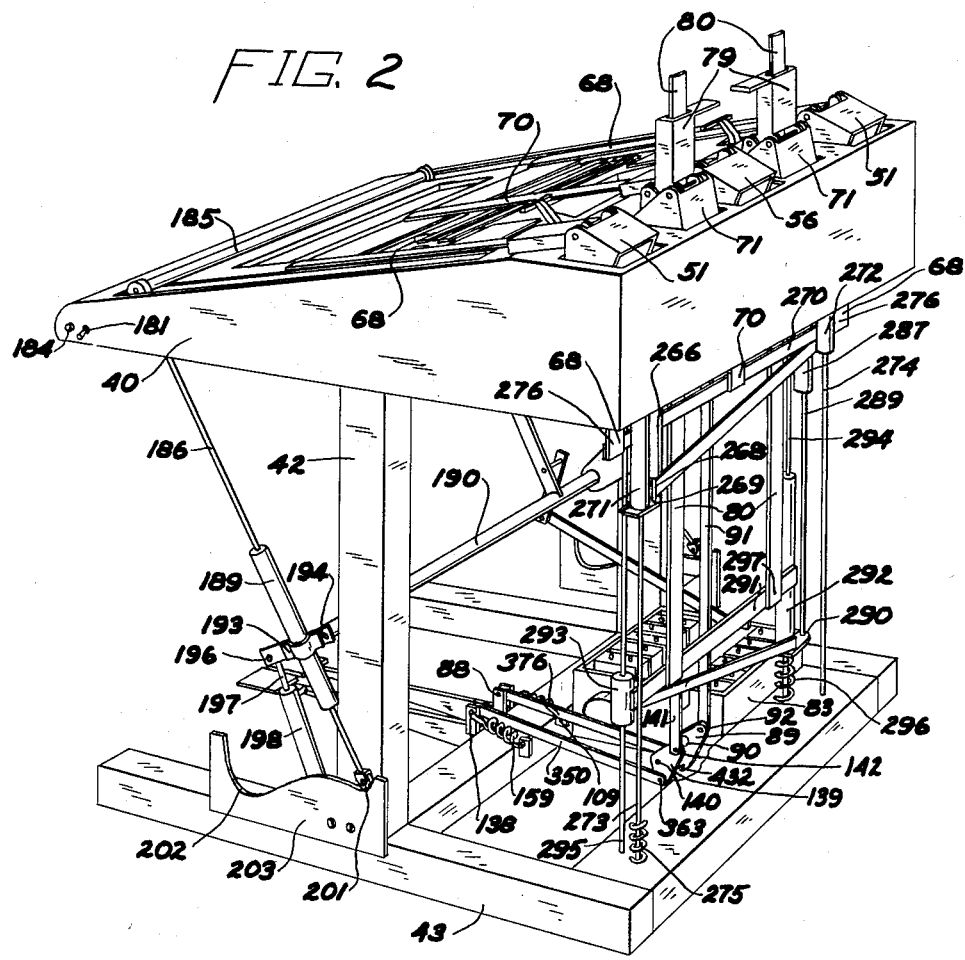
Fig. 2 is a rear perspective view of the folding and sealing machine.
Figure 9:
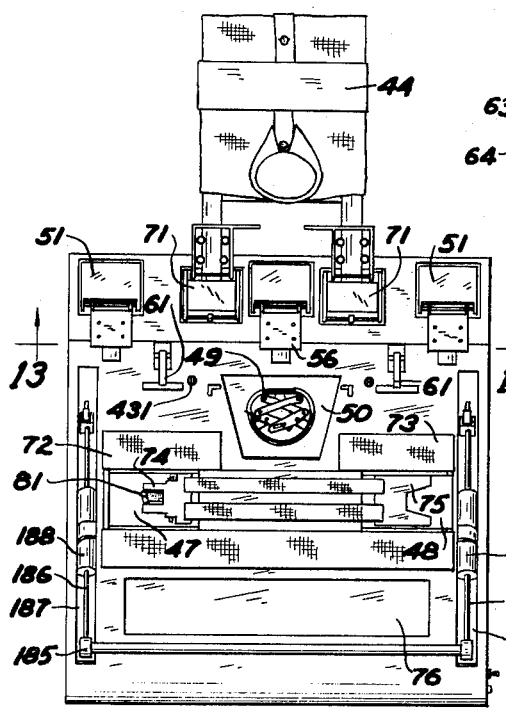
Fig. 9 is a plan view, corresponding generally with the disclosure of Figs. 3, 4, 6 and 8, showing a folded and wrapped shirt as when being ejected from the machine.
Figure 10:
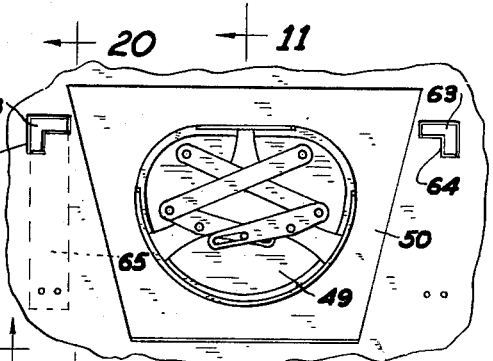
Fig. 10 is a fragmentary plan view, on an enlarged scale, of a collar expander of the machine.
Figure 11:
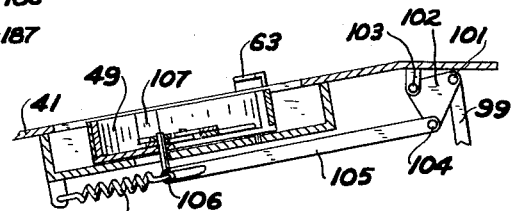
Fig. 11 is a sectional view, taken on line 11—11 in Fig. 10.
Figure 12:
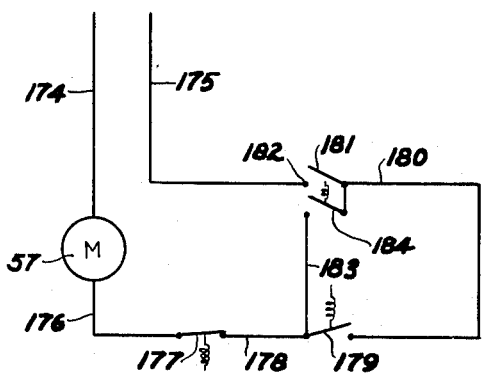
Fig. 12 is a diagrammatic view of a wiring system that can be employed in the machine.

Before commencement of the tail folding operation the guide elements 79 of the intermediate retainers 71 will be swung forwardly and downwardly, from their normal positions as in Figs. 1 and 2, concurrently with extension of the flat strips 80, 80 thus to accomplish downward swinging of said flat strips, will be swung rearwardly and upwardly upon withdrawal of said flat strips from the shirt after completion of the tail folding operation, will be swung forwardly and downwardly concurrently with forward projection of said flat strips to position where capable of being swung down against the body of the shirt to the end that marginal portions of the shirt body can be folded upwardly and inwardly about said flat strips, will be swung upwardly, rearwardly and downwardly during each shirt ejecting operation, and will be swung upwardly and forwardly after each shirt is ejected.

First, second and third vertical cylinders, denoted 301, 302 and 303, respectively, are fixed upon the machine frame. The first vertical cylinder 301 houses a piston (not shown) rigid with an upwardly extending connecting rod 304 pivotally connected, as at 305, to intermediate portions of first and second levers, indicated 306 and 307, respectively. A shorter end portion of each of the first and second levers 306 and 307 is pivotally connected, as at 308, to the lower end of a link 309 having its upper end pivotally connected, as at 310, to the triangular channel piece 161 of the intermediate retainer 71 at the corresponding side of the machine frame. A longer end portion of the first lever 306 is pivotally connected, as at 311, to the lower end of a connecting rod 312 extending downwardly from a piston (not shown) in the second vertical cylinder 302. A longer end portion of the second lever 307 is pivotally connected, as at 313, to the lower end of a connecting rod 314 extending downwardly from a piston (not shown) in the third vertical cylinder 303. A tension coil spring 315 connected, as at 316, to the frame and to a part of the first lever 306 adjacent the connecting rod 312, as at 317, normally urges the longer end portion of said first lever upwardly, and a tension coil spring 318 connected, as at 319, to the frame and to a part of the second lever 307 adjacent the connecting rod 314, as at 320, normally urges the longer end portion of said second lever upwardly.

A damping device for the piston in the first vertical cylinder 301, equivalent to the damping device disclosed in Fig. 19, and for the same purpose, includes an auxiliary cylinder 321. A pipe with flow reducer connects lower portions of the auxiliary cylinder 321 and the first vertical cylinder 301. A pipe connection in an upper part of said auxiliary cylinder 321 is represented at 322, and a pipe connection in an upper part of the first vertical cylinder 301 is indicated 323.

Air under pressure for operating the piston in the first vertical cylinder 301 is provided from the manifold 216 by way of an operating valve 324, equivalent to the operating valve 211. A camming element 325 upon the horizontal shaft 84 is for engagement with a pivotally supported arm 326 for actuating a plunger rigid with a cylindrical valve element, equivalent to the valve element 226, of the operating valve 324 to cause communication to be established between the manifold 216 and the pipe connection 323 and shut off communication between said manifold and the pipe connection 322, and a compression coil spring, equivalent to the compression coil spring 228, of said operating valve 324 is for actuating its cylindrical valve element to establish communication between the manifold 216 and the pipe connection 322 and shut off communication between said manifold and the pipe conection 323.

The pistons in the second and third vertical cylinders 302 and 303, having the connecting rods 312 and 314, respectively, are actuated in the same general manner as is the piston in the cylinder 280 which has the connecting rod 281. Said connecting rods 312 and 314 are forced downwardly by reason of pressure of air from the manifold 216 applied against the corresponding pistons, and the connecting rods and the longer end portions of the first and second levers 306 and 307 secured thereto are returned to elevated position by the tension coil springs 315 and 318.

The connecting rod 304 will be forced downwardly, in a manner obvious from the description hereinbefore made, upon commencement of operation of the electric motor 57 in the accomplishment of the folding operations to cause the guide elements 79 of the intermediate retainers 71 to be swung downwardly concurrently with the extension of the flat strips 80 of said intermediate retainers. The connecting rods 312 and 314 will be forced downwardly upon completion of withdrawal of said flat strips 80 from a shirt to cause said guide elements 79 to be swung upwardly, through an arc of limited magnitude, of a greater or less number of degrees, through the medium of the first and second levers 306 and 307 rotatably mounted on the axis 305 upon the connecting rod 304. Said connecting rods 312 and 314 will be forced upwardly by the tension coil springs 315 and 318 following completion of extension of said flat strips to position where ready for the shirt folding operations, to cause said guide elements 79 to be swung downwardly to flex the forward end portions of the flat strips 80 down against the shirt in advance of operation of the shirt body folders 72 and 73. It will be evident that the links 309 will be depressed in response to forced upward movement of the connecting rods 312 and 314, through the medium of said first and second levers 306 and 307 as these rotate on their common axis 305, to swing the triangular channel pieces 161, and hence said guide elements 79, downwardly. The construction and arrangement will be such that the connecting rod 314 will be forced upwardly before the connecting rod 312 is forced upwardly, thus to cause the flat strip 80 of one of the intermediate retainers 71, the one at the left in Fig. 6, to be swung down against a shirt in advance of operation of the shirt body folder 72 before the other intermediate retainer, the one at the right in said Fig. 6, is swung down against the shirt in advance of operation of the shirt body folder 73. It is desirable that one of the shirt body folders perform its operation of folding a side marginal portion of the shirt body about one of the intermediate retainers before the other intermediate retainer is in position where the other shirt body folder can perform its folding operation, to the end that the shirt body folder first to operate can lay the free marginal part of the side portion which it folds beneath the flat strip of the intermediate retainer opposite the one about which said shirt body folder first to operate makes its fold. See Figs. 6 and 7. The guide elements 79 will be swung upwardly, rearwardly and then downwardly, upon completion of the sealing operation, in response to forced upward movement of the connecting rod 304, until each shirt is ejected from the machine by withdrawal therefrom of the flat strips 80. The links 309 will be depressed and elevated to equal extent in response to depression and elevation of said connecting rod 304, through the medium of the first and second levers 306 and 307 as these are caused to swing downwardly and upwardly upon their axes 311 and 313 on the connecting rods 312 and 314, respectively. The guide elements 79 will be swung upwardly and forwardly substantially to vertical position, as disclosed in Figs. 1 and 2 of the drawings, in response to forced downward movement of the connecting rod 304 after each shirt is ejected. That is to say, the construction and arrangement are such in the disclosure as made that the guide elements 79 will reach intermediate, vertical position, as in said Figs. 1 and 2, when the main operating valve 210 shuts off pressure from the manifold 216. Concurrently with shutting off of pressure from said manifold, an extension 327 rigid with the pivotally supported arm 252 will actuate the cam box switch 179 to open position, thus to cause the electric motor 57 to be deenergized and the machine to become inoperative. The construction and arrangement also are such that said cam box switch 179 will become closed immediately upon commencement of operation of the electric motor 57, in response to closing of the starter switch 184, to cause the horizontal shaft 84 to rotate.

Side marginal portions of the body of each shirt and parts of the sleeves connected therewith are caused to be folded first upwardly and then inwardly, about the flat strips 80 of the intermediate retainers 71, and laid down upon the shirt body with one of the side marginal portions in overlying relation to the other, upon completion of withdrawal of the flat strips 68, 70 of the side and center retainers from the shirt and the placing of the flat strips 80 of the intermediate retainers down against the shirt.

Each shirt to be folded is laid upon spaced apart, parallel, flexible strips 328 themselves rested upon the intermediate portion 46 of the horizontal upper wall 41, at the forward and rearward sides of the flexible strips 45, in spaced, parallel relation to said flexible strips 45.

The shirt body folder 72 includes spaced, generally L-shape members 329 having inner shorter arms thereof fixed, as at 330, upon a transversely extending horizontal shaft 331, suitably and conveniently mounted on the machine frame, and outer longer arms thereof fixed to a cross rod 332 having extensions thereof secured to adjacent ends of the flexible strips 328. The transversely extending horizontal shaft 331 fixedly supports a gear 333. A gear segment 334, rotatably mounted, as at 335, upon the machine frame beneath the gear 333, is in mesh with said gear 333, and a downwardly extending actuator arm 336 is rigid with said gear segment 334. A cylinder 337, pivotally supported on the machine frame, as at 338, houses a piston (not shown) rigid with an upwardly extending connecting rod 339 having its upper end pivotally connected, as at 340, to a lower portion of the actuator arm 336. The piston in the cylinder 337 is actuated in the same general manner as is the piston 200. At the appropriate time, after the flat strip 80 at the same side of the machine is properly positioned, the L-shape members 329 of the shirt body folder 72 are swung from their normal, inoperative position, as in Fig. 29, to their operated position, as in Fig. 28, thus to cause said folder 72 to perform its intended service. It will be apparent that forced downward movement of the connecting rod 339 will cause the gear segment 334 to be rotated thus to rotate the gear 333 and swing the L-shape members 329 upwardly and toward the shirt. Upon completion of its folding operation, the shirt body folder 72 will be swung back to its position as in said Fig. 29 in response to forced upward movement of the piston in the cylinder 337.

The shirt body folder 73 includes spaced, generally L-shape members 341 having inner shorter arms thereof fixed, as at 342, upon a transversely extending horizontal shaft 343, suitable and conveniently mounted on the machine frame, and outer longer arms thereof fixed to extension pieces 344 secured to adjacent ends of the flexible strips 328. The transversely extending longitudinal shaft 342 fixedly supports a gear 345. A gear segment 346, rotatably mounted, as at 347, upon the frame beneath the gear 345, is in mesh with said gear 345, and a downwardly extending actuator arm 348 is rigid with the gear segment 346. A cylinder 349, pivotally supported on the frame, as at 339, houses a piston (not shown) rigid with an upwardly extending connecting rod 351 having its upper end pivotally connected, as at 352, to a lower portion of the actuator arm 348. The piston in the cylinder 349 is actuated in the same general manner as are the piston 200 and the piston in the cylinder 337. After the flat strip 80 at the same side of the machine is properly positioned, the L-shape members 341 of the shirt body folder 73 are swung from their normal, inoperative position, as in Fig. 28, to their operated position, as in Fig. 29, thus to cause said folder 73 to perform its intended service. Forced downward movement of the connecting rod 351 causes the gear segment 346 to be rotated thus to rotate the gear 335 and swing the L-shape members 341 upwardly and toward the shirt. Upon completion of its folding operation, the shirt body folder 73 will be swung back to its position as in Fig. 28 in response to forced upward movement of the piston in the cylinder 349.

The folder 75, at the right in Figs. 27, 28 and 29, for the wrapper is operative in response to and simultaneously with operation of the shirt body folder 73. Said folder 75 includes generally L-shape members 353 having inner lengths thereof rotatably mounted, as at 354, upon the transverse shaft 343 and outer lengths thereof rotatably supported, as at 355, upon a cross rod 356 itself secured to the adjacent ends of the flexible strips 45. Each of curled expansion springs 357 has one of its extremities secured to the cross rod 356, and its other extremity secured to a cross rod 358 supported by the L-shape members 341. Extension pieces 359 rigid with the L-shape members 353 are adapted to be engaged against the cross pin 358 when the folder 75 is in normal, inoperative position, as in Fig. 28, thus to limit the extent to which the extremities of the curled expansion springs 357 can be moved apart. The construction and arrangement are such that when the folder 75 is in its inoperative position, the L-shape members 353 are disposed above the L-shape members 341, and when said folder 75 is in its operative position, said L-shape members 353 are disposed below said L-shape members 341.

The folder 74, at the left in Figs. 27, 28 and 29, for the wrapper is operative after the folders 73 and 75 have operated to perform their intended services. Said folder 74 includes spaced frame members 360 having inner portions thereof fixed, as at 361, on a tubular member 362 rotatable upon the transversely extending horizontal shaft 331. Generally L-shape members 364 have inner lengths thereof rotatably mounted, as at 365, upon said tubular member 362 and outer lengths thereof rotatably supported, as at 366, upon a cross rod 367 itself secured to the adjacent ends of the flexible strips 45. Each of curled expansion springs 368 has one of its extremities secured to the cross rod 367, and its other extremity secured to a cross rod 369 supported by the frame members 360. Extension pieces 370 rigid with the L-shape members 364 are adapted to be engaged against the cross rod 369 when the folder 74 is in its inoperative position, as in Fig. 34, thus to limit the extent to which the extremities of the curled expansion springs 368 can be moved apart. When said folder 74 is in its inoperative position, the L-shape members 364 are disposed above the frame members 360, and when said folder 74 is in its operative position, as in Fig. 31, said L-shape members 364 are disposed below said frame members 360. The tubular member 362 fixedly supports a gear 371. A gear segment 372, rotatably mounted, as at 373, upon the machine frame beneath the gear 371, is in mesh with said gear 371, and a downwardly extending actuator arm 374 is rigid with the gear segment 372. A cylinder 375, pivotally supported on the frame, as at 338, houses a piston (not shown) rigid with an upwardly extending connecting rod 377 having its upper end pivotally connected, as at 378, to a lower portion of the actuator arm 374. The piston in the cylinder 375 is actuated in the same general manner as are the piston 200 and the pistons in the cylinders 337 and 349. After the folders 73 and 75 have operated, the frame members 360 are swung from their normal position, as in Fig. 34, to their operative position, as in Fig. 30, thus to cause the folder 74 to perform its intended service. Forced downward movement of the connecting rod 377 causes the gear segment 372 to be rotated thus to rotate the gear 371 and swing the frame members 360 upwardly and toward the shirt.

The folders 75 and 74 for the wrapper are constructed as illustrated and described so that they can be properly operative on articles or packages of varying thickness to be wrapped and sealed closed. The curled expansion springs 357 and 368 retain the L-shape members 353 and 364 in proper relation to the L-shape members 341 and the frame members 360, respectively, so that the opposite end portions of the flexible strips 45 will be resiliently pressed downwardly when said folders 75 and 74 are operative, and, at the same time, there is clearance between the members 341, 353 and 360, 364, respectively, permitting receding movement of said members 353 and 364, against resilient action of said curled expansion springs. The extension pieces 359 and 370 will be in spaced relation to the cross rods 358 and 369, respectively, in any instance when the opposite end portions of the flexible strips 45 are pressed downwardly to extent causing the curled expansion springs 357 and 368 to be compressed. Stated otherwise, movement of the folders 75 and 74 from inoperative to operative position down against an article or package will cause said curled expansion springs 357 and 368 to be compressed, thus to resiliently urge the opposite end portions of the flexible strips 45 down against the article or package, and with movement of the L-shape members 341 and the frame members 360 toward an article or package after movement of the L-shape members 353 and 364 has been arrested, by reason of engagement of the opposite end portions of the flexible strips 45 with said article or package, the extension pieces 359 and 370 will become removed from the cross rods 358 and 369, respectively.

The tape feeding and "sticker" affixing mechanism 81 includes a sealing head 379 of general rectilinear configuration rotatably mounted upon a horizontal shaft 380 which passes centrally through said sealing head and is in parallel relation to the transverse shaft 331. As shown, the sealing head 379 is square in transverse section and includes two sets of oppositely disposed, parallel working or sealing surfaces, each denoted 381, substantially in parallel relation to the horizontal shaft 331. Each working or sealing surface 381 is provided, in the disclosed embodiment of the invention, by a flat resilient member 382. Serrations or pins 383, projecting from a forward edge portion of each working or sealing surface and extending thereacross in parallel relation to the horizontal shaft 331, are for a purpose to be made plain.

A square block 384 of the sealing head 379 has its opposite surfaces cut away, save at the four corners of the block, to provide rectilinear concavities at opposed surfaces of said block covered by parallel rectilinear plates, denoted 385 and 386, respectively, rigidly secured to the block. Each of the flat resilient members 382 integrally supports spaced protuberances 387 which extend interiorly from an end portion of the corresponding flat resilient member, and oppositely disposed, outwardly extending projections 388 upon the protuberances 387 are situated in openings 389 through the rectilinear plates 385 and 386, respectively, thus to secure the flat resilient members 382 upon the square block 384. Interiorly extending oblique elements upon opposite side edges of each resilient member 382 adjacent the end thereof opposite the protuberances 387 are indicated 390. Each set of serrations or pins 383 is integral with a flat plate 391 situated between the rectilinear plates 385 and 386 in a thicknesswise slot in the square block 384 and having oppositely disposed, outwardly extending projections 392 situated in openings 393 through said rectilinear plates 385 and 386, respectively.

Outer end portions 394 of the spaced frame members 360 are situated at the opposite ends of the sealing head 379, and the opposite ends of the horizontal shaft 380 are rotatably mounted in said outer end portions 394. Inner end portions 395 of said spaced frame members 360 are situated at the opposite ends of the roller 78, and the opposite ends of a cross pin 396, in parallel relation to the horizontal shaft 331 and rotatably supporting the roller 78, are supported in said inner end portions 395. The continuous tape 77 is situated upon the roller 78 to be capable of being unwound therefrom in an ordinary and well known manner.

The horizontal shaft 380 rotatably supports parallel actuator plates 397 situated at opposite ends of and in parallel relation to the sealing head 379, between said sealing head and the outer end portions 394 of the frame members 360. As disclosed, each actuator plate 397 is V-shape. A cross pin 398 connecting outer ends of upper legs of the actuator plates rotatably supports a severing roller 399 situated between said actuator plates. As disclosed, the cross pin 398 and severing roller 399 are in a plane parallel with a plane passed longitudinally through the horizontal shaft 380, but said cross pin and severing roller extend along a line somewhat oblique to the line along which said horizontal shaft 380 extends. A cross pin 400 mounted in the bases of the V-shape actuator plates 397 rotatably supports the adjacent ends of inwardly extending actuator elements 401. The horizontal shaft 380 is situated in outer end portions of lower legs of said actuator plates 397, opposite said upper legs supporting the cross pin 398, and a lower, inner portion of the lower leg of each actuator plate is shaped to provide a protuberance 402 adapted to be successively engaged against the interiorly extending oblique elements 390 upon the flat resilient members 382.

Each of spaced, parallel L-levers 403 includes a shorter, inner arm 404 rotatably mounted upon the tubular member 362 and a longer, outer arm 405 pivotally connected to the inner end portions of the actuator elements 401 through the instrumentality of a cross pin 406 situated in longitudinal slots 407 in said inner end portions of said actuator elements. A tension coil spring 408, having one of its ends secured to the cross pin 400 and its other end secured to the cross pin 406, normally urges said cross pin 406 along the longitudinal slots 407 toward said cross pin 400. Stops 409 on the machine frame are adapted to be engaged by the shorter, inner arms 404 to limit the extent of swinging movement of the L-levers 403 toward the inoperative position of the sealing mechanism, and stops 410 on said machine frame are adapted to be engaged by the longer, outer arms 405 to limit the extent of swinging movement of said L-levers 403 toward the operative position of said sealing mechanism.

The outer surface of the rectilinear plate 385 includes four arcuate camming slots, each denoted 411, spaced 90 degrees apart about the horizontal shaft 380 in concentric relation thereto. Each of the camming slots 411 is deep at its forward end and shallow at its rearward end. Stated differently, each camming slot 411 is defined at one of its ends by a working surface disposed parallelly of the horizontal shaft 380, and defined at the rear of the working surface by an outwardly sloping surface which merges smoothly in the outer surface of said rectilinear plate 385.

The outer end portion 394 of one of the frame members 360 slidably supports a camming pin 412 which is in parallel relation to the horizontal shaft 380 to be capable of selectively entering the arcuate camming slots 411. A spring arm 413 upon the frame member 360 having the camming pin 412 resiliently urges said camming pin toward the sealing head.

One of the actuator plates 397 slidably supports a camming pin 414, also in parallel relation to said horizontal shaft 380, and a spring arm 415 upon the actuator plate having said camming pin 414 resiliently urges the last mentioned camming pin toward the sealing head. The camming pin 414 is situated at the side of the horizontal shaft 380 opposite the camming pin 412 to be capable of selectively entering the camming slots 411.

The continuous tape 77 extends over and against three sealing surfaces of the sealing head 379 when the machine is inoperative, with the adhesive containing surface of said continuous tape facing outwardly. Also, when the machine is at rest, the serrations or pins extending outwardly from each of the three sealing surfaces engaged by the continuous tape are imbedded therein.

The construction and arrangement are such that when the sealing mechanism is inoperative, as in Fig. 34 of the drawings, the parallel actuator plates 397 will be set relative to the frame members 360 and the sealing head 379 to situate the severing roller as in said Fig. 34, at the outer side of and adjacent to the rearward end of the sealing surface of said head 379 which is at the upper side of the horizontal shaft 380. Also when the sealing mechanism is at rest, the camming pin 414 will be engaged in an arcuate camming slot 411 in proximate relation to its working surface while the camming pin 412 is engaged in a different camming slot 411 in proximate relation to its working surface.

The tension coil spring 408 insures that the parallel actuator plates 397 will be returned to the position as in Figs. 28 and 34 from the position as in Figs. 29 and 31. Said tension coil spring becomes lengthened with increase and collapsed with decrease in distance between the cross pins 400 and 406.

Before completion of movement of the frame members 360 to the operative position of the folder 74 and the sealing mechanism, as in Figs. 29 and 31, the longer arms 405 of the L-levers 403 will engage the stops 410, as in said Fig. 31, and with movement thereafter of said frame members 360 to their operative position, the horizontal shaft 380 will be moved away from said longer arm 405 to cause the actuator plates 397 to be rotated about said horizontal shaft 380 in reverse direction, in counterclockwise direction as shown in Fig. 30. Also with movement of said frame members 360 toward the operative position of the folder 74 and the sealing mechanism after said longer arms 405 have engaged the stops 410, the tension coil spring 408 will become expanded. Rotation in counterclockwise direction of the parallel actuator plates 397 caused by movement of the frame members 360 toward the operative position of the folder 74 and the sealing mechanism after the longer arms 405 have engaged the stops 410 will cause the severing roller 399 to be swung from its position as in Fig. 30 toward its position as in Figs. 28 and 34, clear of the lower sealing surface of the head 379, and thus will be accomplished severing, at a corner knife edge 416 of the square block 384, of a "sticker" on said lower sealing surface. The construction and arrangement will be such that there will be counterclockwise rotational movement of the parallel actuator plates 397 through a sufficient arc to cause severing of the "sticker" regardless of the arc through which it is necessary to rotate the sealing head 379 to cause the "sticker" to be applied. Severing of the "stickers" is accomplished in response to riding of the severing roller 399 with pressure over the corner knife edges 416 of said square block 384. The parallel actuator plates 397 are returned from the position in which situated directly after the "sticker" severing operation is completed to their position as in Figs. 28 and 34 in response to force exerted by the tension coil spring 408 upon movement of the frame members 360 back toward inoperative position. During counterclockwise rotation of the parallel actuator plates 397, the camming pin 414 will ride rearwardly from the camming slot in which situated while the sealing mechanism was last at rest and become situated in the next succeeding camming slot in proximate relation to its working surface while the camming pin 412 precludes rotation of the sealing head in reverse direction, in counterclockwise direction as shown in the drawings, by reason of engagement of said camming pin 412 with the working surface of one of said camming slots.

Reverse rotational movement of the parallel actuator plates 397 causing the severing roller 399 to be moved from its position as in Fig. 30 toward its position as in Figs. 28 and 34 also will cause the protuberances 402 on the lower legs of the parallel actuator plates 397 to push outwardly on the oblique elements 390 rigid with the flat resilient member 382 providing the sealing surface 381 at the time operative, thus to cause the "sticker" to be released from the serrations or pins 383 by which held.

Before completion of movement of the frame members 360 to their inoperative position, as in Figs. 28 and 34, the shorter arms 404 of the L-levers 403 will engage the stops 409, as in Fig. 34, and with movement thereafter of said frame members 360 to their inoperative position, the horizontal shaft 380 will be moved toward said shorter arm 404 in such manner as to cause the parallel actuator plates 397 to be rotated about the cross pin 400 and said horizontal shaft 380 through an arc of 90 degrees in advancing direction, in clockwise direction as shown in Figs. 28 and 34. This rotation in clockwise direction of said parallel actuator plates will cause the camming pin 414 to rotate the sealing head 379 ahead 90 degrees, together with the parallel actuator plates 397 as a unit, and cause the camming pin 412 to be removed rearwardly from the camming slot in which situated at the commencement of reverse rotational movement of said parallel actuator plates and become situated in the next succeeding camming slot in proximate relation to its working surface. When the sealing mechanism reaches its inoperative position, its parts are situated to be ready to commence another, succeeding sealing operation.

The sealing head of a tape feeding and "sticker" affixing mechanism of construction as so far described would have tendency toward rotating beyond horizontal position, in clockwise direction in Figs. 30 and 31, when said sealing head, together with the frame members 360, was swung toward operative position on the horizontal shaft 331 as an axis, thus to be incapable in some instances of causing the severed "stickers" to be properly applied to articles or packages, especially articles or packages which were of unusual thickness. A construction and arrangement now to be described is included to make certain that each sealing surface 381 will, in its turn, properly present itself in substantially horizontal position when ready or set to cause a "sticker" to be affixed to an article or package, regardless of the thickness, within limits, of said article or package.

The right ends of the flexible strips 45 in Figs. 27, 28 and 29 are secured to the cross rod 356 through the medium of a hold-down plate 417 rotatably supported upon said cross rod 356, and the left ends of said flexible strips 45 in Figs. 27, 28, 29, 30, 31 and 34 are secured to the cross rod 367 through the medium of a hold-down plate 418 rotatably supported upon said cross rod 367.

An extension 419 on the hold-down plate 418, at the side of the cross pin 367 opposite said hold-down plate 418, integrally or rigidly supports a pin 420 snugly situated between spaced arms 421 of a bifurcated member 422 upon the horizontal shaft 380.

The outer surface of the rectilinear plate 386 includes four arcuate camming slots, each represented 423, equivalent to the arcuate camming slots 411, spaced 90 degrees apart about said horizontal shaft 380 in concentric relation thereto. Each of the camming slots 423 is deep at its rearward end and shallow at its forward end. That is, each camming slot 423 is defined at one of its ends by a working surface disposed parallelly of the horizontal shaft 380, and defined at the front of the working surface by an outwardly sloping surface which merges smoothly in the outer surface of said rectilinear plate 386.

A portion of the bifurcated member 422 at the side of the horizontal shaft 380 oposite the spaced arms 421 slidably supports a camming pin 424 which is in parallel relation to said horizontal shaft 380 to be capable of selectively entering the arcuate camming slots 423. A spring arm 425, upon the bifurcated member 422 and in a transverse slot in the adjacent end of the horizontal shaft 380, resiliently urges the camming pin 424 toward the sealer head, and said bifurcated member is secured to the horizontal shaft 380 to be rotatable therewith.

An actuating plunger 426 for flexing the spring arm 425 outwardly, thus to move the camming pin 424 away from the rectilinear plate 386, is mounted for longitudinal movement in the horizontal shaft 380.

An actuator lever 427 has an intermediate portion thereof pivotally supported, as at 428, upon an upper edge of one of the frame members 360 for rotative movement of said actuator lever to cause an end portion 429 thereof to be swung toward and away from the actuating plunger 426. The other end portion of the actuator lever 427 includes an interiorly facing beveled end 430 adapted to be engaged by the longer, outer arm 405 of one of the L-levers 403 in response to movement of the frame members 360 toward the inoperative position of the sealing mechanism to cause the end portion 429 of the actuator lever 427 to forcibly engage the adjacent end of the actuating plunger 426 and cause it to be slid longitudinally in the horizontal shaft 380 thus to flex the spring arm 425 outwardly and move the camming pin 424 away from the rectilinear plate 386.

With rotation in counterclockwise direction of the parallel actuator plates 397 caused by movement of the frame members 360 toward the operative position of the sealing mechanism after the longer arms 405 have engaged the stops 410, there also will be rotation of the sealing head in clockwise direction. The construction and arrangement will be such that the camming pin 424 will engage against the working surface of one of the arcuate camming slots 423 each time a lowermost sealing surface 381 reaches substantially horizontal position, thus to arrest clockwise rotation of the sealing head; that is, clockwise rotation of the sealing head will be arrested each time a lowermost sealing surface of the sealing head becomes alined with, or in parallel relation to, the hold-down plate 418 as this rests, in substantially horizontal position, upon an article or package being sealed closed.

With movement of the frame members 360 toward the inoperative position of the sealing mechanism after the shorter, inner arms 404 of the L-levers 403 have engaged the stops 409, the beveled end 430 of the actuator lever 427 will be pushed against the longer, outer arm of an L-lever 403 thus to cause the end portion 429 of the actuator lever 427 to force the actuating plunger 426 to slide in the horizontal shaft 380 and flex the spring arm 425 to cause the camming pin 424 to be removed from the camming slot 423 in which said camming pin 424 was situated. The camming pin 424 of course must be removed from the rectilinear plate before commencement of relative rotation of the parallel actuator plates 397 and the sealing head 379 accomplished in response to and concurrently with movement of the sealing mechanism to inoperative position after the shorter arms 404 of the L-levers 403 have engaged the stop pins 409, and said camming pin 424 will be retained in spaced relation to said rectilinear plate 386 until the frame members 360 are swung through a sufficient arc toward the operative position of the sealing mechanism after the longer arms 405 of the L-levers 403 have engaged the stops 410 to cause the beveled end 430 of the actuator lever 427 to be withdrawn from the longer arm 405 adjacent said actuator lever 427.

The construction and arrangement will be such that when the sealing head 387 is operative to affix each "sticker" to an article or package, the hold-down plates 417 and 418 will be engaged against portions of a wrapper, such as 44, to receive the "sticker" at locations adjacent opposite sides of the sealing head 379, about as in Fig. 29, thus to retain overlapped end portions of the wrapper in "sticker" receiving position.

Pegs 431, extending upwardly from the horizontal upper wall 41 of the frame of the machine, are for use by an operator when it is desired to "line up" the button holes of French cuffs of shirts preparatory to folding the sleeves and cuffs of the shirts upwardly and inwardly.

What is claimed is:

1. In a folding machine, a surface for receiving a foldable article in spread out condition, means for accomplishing a folding operation upon said article, a device for retaining the article on said surface while said folding operation is being accomplished, and mechanism for removing said device from said article after said folding operation has been accomplished.

2. In a folding machine, a surface for receiving a foldable article in spread out condition, first devices for retaining said article on said surface, means for accomplishing folding operations upon said article including second devices adapted to engage the article, means for removing said first devices from said article after said second devices have engaged the article, and mechanism for withdrawing said second devices from said article after said means for accomplishing folding operations has operated.

3. In a folding machine, a surface for receiving a shirt in spread out condition, first devices for retaining said shirt on said surface while sleeves of said shirt are folded inwardly, means for accomplishing folding operations upon said shirt including a second device between and in spaced relation to said first devices adapted to engage the shirt, means for removing said first devices from said shirt after said second device has engaged the shirt, and mechanism for withdrawing said second device from said shift after said means for accomplishing folding operations have operated.

4. In a folding machine, a surface for receiving a shirt in spread out condition, first devices for retaining said shirt on said surface while sleeves of the shirt are folding inwardly, an expander for detachably retaining a collar on said shirt in fixed relation to said surface, means for accomplishing folding operations upon said shirt while said expander retains said collar in fixed relation to said surface including second devices between and in spaced relation to said first devices and at opposite sides of and in spaced relation to said expander adapted to engage the shirt, means for removing said first devices from the shirt and means for releasing said expander from said collar after said second devices have engaged said shirt, and mechanism for withdrawing said second devices from the shirt after said means for accomplishing folding operations have operated.

5. In a folding machine, a surface for receiving a shirt in spread out condition, first devices for retaining said shirt on said surface while sleeves of said shirt are folded inwardly, means for accomplishing body folding operations upon said shirt including second devices between and in spaced relation to said first devices adapted to engage the shirt, means for folding a lower portion of the shirt about at least one of said first or second devices before said body folding means are operative, means for removing said first devices from the shirt after said second devices have engaged said shirt, and mechanism for withdrawing said second devices from said shirt after said body folding means have operated.

6. In a folding machine, a surface for receiving a shirt in spread out condition, first devices for retaining said shirt on said surface while sleeves of the shirt are folded inwardly, an expander for detachably retaining a collar on said shirt in fixed relation to said surface, means for accomplishing body folding operations upon said shirt while said expander retains said collar in fixed relation to said surface including second devices between and in spaced relation to said first devices and at opposite sides of and in spaced relation to said expander adapted to engage the shirt, means for folding a lower portion of the shirt about at least one of said first or second devices before said body folding means are operative, means for removing said first devices from the shirt and means for releasing said expander from said collar after said second devices have engaged said shirt, and mechanism for withdrawing said second devices from the shirt after said means for accomplishing body folding operations have operated.

7. In a folding machine, a surface for receiving a shirt in spread out condition, first devices for retaining said shirt on said surface while sleeves of said shirt are folded inwardly, means for accomplishing body folding operations upon said shirt including second devices between and in spaced relation to said first devices adapted to engage the shirt, means for folding a lower portion of the shirt about at least one of said first or second devices before said body folding means are operative, and means for removing said first devices from the shirt after said second devices have engaged said shirt.

8. In a folding machine, a surface for receiving a shirt in spread out condition, first devices for retaining said shirt on said surface while sleeves of the shirt are folded inwardly, an expander for detachably retaining a collar on said shirt in fixed relation to said surface, means for accomplishing body folding operations upon said shirt while said expander retains said collar in fixed relation to said surface including second devices between and in spaced relation to said first devices and at opposite sides of and in spaced relation to said expander adapted to engage the shirt, means for folding a lower portion of the shirt about at least one of said first or second devices before said body folding means are operative, and means for removing said first devices from the shirt and means for releasing said expander from said collar after said second devices have engaged said shirt.

9. In a folding and wrapping machine, a surface for receiving a shirt in spread out condition, first devices for retaining said shirt on said surface while sleeves of the shirt are folded inwardly, means for accomplishing body folding operations upon said shirt including second devices between and in spaced relation to said first devices adapted to engage the shirt, means for folding a lower portion of the shirt about at least one of said devices before said body folding means are operative, means for removing said first devices from the shirt after said second devices have engaged said shirt, and mechanism for folding a strip of material about said shirt and connecting opposite end portions of said strip to each other after said shirt body folding means have operated.

10. In a folding and wrapping machine, a surface for receiving a shirt in spread out condition, first devices for retaining said shirt on said surface while sleeves of the shirt are folded inwardly, an expander for detachably retaining a collar on said shirt in fixed relation to said surface, means for accomplishing body folding operations upon said shirt while said expander retains said collar in fixed relation to said surface including second devices between and in spaced relation to said first devices and at opposite sides of and in spaced relation to said expander adapted to engage the shirt, means for folding a lower portion of the shirt about at least one of said devices before said body folding means are operative, means for removing said first devices from the shirt and means for releasing said expander from said collar after said second devices have engaged said shirt, and mechanism for folding a strip of material about said shirt and connecting opposite end portions of said strip to each other after said shirt body folding means have operated.

11. In a folding machine, a surface for receiving a shirt in spread out condition, first devices for retaining said shirt on said surface while sleeves of the shirt are folded inwardly, means for accomplishing body folding operations upon said shirt including second devices between and in spaced relation to said first devices adapted to engage the shirt, means for folding a lower portion of the shirt about at least one of said devices before said body folding means are operative, means for removing said first devices from the shirt after said second devices have engaged said shirt, and mechanism for ejecting said shirt from the machine.

12. In a folding machine, a surface for receiving a shirt in spread out condition, first devices for retaining said shirt on said surface while sleeves of the shirt are folded inwardly, means for accomplishing body folding operations upon said shirt including second devices between and in spaced relation to said first devices adapted to engage the shirt, means for folding a lower portion of the shirt about at least one of said devices before said body folding means are operative, means for removing said first devices from the shirt after said second devices have engaged said shirt, and mechanism for ejecting said shirt from the machine including means for withdrawing said second devices from the shirt.

13. In a folding machine, a surface for receiving a shirt in spread out condition, first devices for retaining said shirt on said surface while sleeves of the shirt are folded inwardly, an expander for detachably retaining a collar on said shirt in fixed relation to said surface, means for accomplishing body folding operations upon said shirt while said expander retains said collar in fixed relation to said surface including second devices between and in spaced relation to said first devices and at opposite sides of and in spaced relation to said expander adapted to engage the shirt, means for folding a lower portion of the shirt about at least one of said devices before said body folding means are operative, means for removing said first devices from the shirt and means for releasing said expander from said collar after said second devices have engaged said shirt, and mechanism for ejecting said shirt from the machine.

14. In a folding machine, a surface for receiving a shirt in spread out condition, first devices for retaining said shirt on said surface while sleeves of the shirt are folded inwardly, an expander for detachably retaining a collar on said shirt in fixed relation to said surface, means for accomplishing body folding operations upon said shirt while said expander retains said collar in fixed relation to said surface including second devices between and in spaced relation to said first devices and at opposite sides of and in spaced relation to said expander adapted to engage the shirt, means for folding a lower portion of the shirt about at least one of said devices before said body folding means are operative, means for removing said first devices from the shirt and means for releasing said expander from said collar after said second devices have engaged said shirt, and mechanism for ejecting said shirt from the machine including means for withdrawing said second devices from the shirt.

15. In a folding and wrapping machine, a surface for receiving a shirt in spread out condition, first devices for retaining said shirt on said surface while sleeves of the shirt are folded inwardly, means for accomplishing body folding operations upon said shirt including second devices between and in spaced relation to said first devices adapted to engage the shirt, means for folding a lower portion of the shirt about at least one of said devices before said body folding means are operative, means for removing said first devices from the shirt after said second devices have engaged said shirt, mechanism for folding a strip of material about said shirt and connecting opposite end portions of said strip to each other after said shirt body folding means have operated, and mechanism for ejecting said shirt from the machine.

16. In a folding and wrapping machine, a surface for receiving a shirt in spread out condition, first devices for retaining said shirt on said surface while sleeves of the shirt are folded inwardly, means for accomplishing body folding operations upon said shirt including second devices between and in spaced relation to said first devices adapted to engage the shirt, means for folding a lower portion of the shirt about at least one of said devices before said body folding means are operative, means for removing said first devices from the shirt after said second devices have engaged said shirt, mechanism for folding a strip of material about said shirt and connecting opposite end portions of said strip to each other after said shirt body folding means have operated, and mechanism for ejecting said shirt from the machine including means for withdrawing said second devices from the shirt.

17. In a folding and wrapping machine, a surface for receiving a shirt in spread out condition, first devices for retaining said shirt on said surface while sleeves of the shirt are folded inwardly, an expander for detachably retaining a collar on said shirt in fixed relation to said surface, means for accomplishing body folding operations upon said shirt while said expander retains said collar in fixed relation to said surface including second devices between and in spaced relation to said first devices and at opposite sides of and in spaced relation to said expander adapted to engage the shirt, means for folding a lower portion of the shirt about at least one of said devices before said body folding means are operative, means for removing said first devices from the shirt and means for releasing said expander from said collar after said second devices have engaged said shirt, mechanism for folding a strip of material about said shirt and connecting opposite end portions of said strip to each other after said shirt body folding means have operated, and mechanism for ejecting said shirt from the machine.

18. In a folding and wrapping machine, a surface for receiving a shirt in spread out condition, first devices for retaining said shirt on said surface while sleeves of the shirt are folded inwardly, an expander for detachably retaining a collar on said shirt in fixed relation to said surface, means for accomplishing body folding operations upon said shirt while said expander retains said collar in fixed relation to said surface including second devices between and in spaced relation to said first devices and at opposite sides of and in spaced relation to said expander adapted to engage the shirt, means for folding a lower portion of the shirt about at least one of said devices before said body folding means are operative, means for removing said first devices from the shirt and means for releasing said expander from said collar after said second devices have engaged said shirt, mechanism for folding a strip of material about said shirt and connecting opposite end portions of said strip to each other after said shirt body folding means have operated, and mechanism for ejecting said shirt from the machine including means for withdrawing said second devices from the shirt.

19. In a folding machine, a surface for receiving a foldable article in spread out condition, means for accomplishing a folding operation upon said article, a device for retaining the article on said surface while said folding operation is being accomplished, and mechanism for causing the article to be removed from said device after said folding operation has been accomplished.

20. In a folding machine, a surface for receiving a foldable article in spread out condition, first devices for retaining said article on said surface, means for accomplishing folding operations upon said article including second devices adapted to engage the article, and means for removing said first devices from said article after said second devices have engaged the article.

21. In a folding machine, a surface for receiving a foldable article in spread out condition, first devices for retaining said article on said surface, means for accomplishing folding operations upon said article including second devices adapted to engage the article, means for removing said first devices from said article after said second devices have engaged the article, and mechanism for causing the article to be removed from said second devices after said folding operations have been accomplished.

22. In a folding machine, a surface for receiving a shirt in spread out condition, first devices for retaining said shirt on said surface while sleeves of said shirt are folded inwardly, means for accomplishing folding operations upon said shirt including second devices between and in spaced relation to said first devices adapted to engage the shirt, and means for removing said first devices from said shirt after said second devices have engaged the shirt.

23. In a folding machine, a surface for receiving a shirt in spread out condition, first devices for retaining said shirt on said surface while sleeves of said shirt are folded inwardly, means for accomplishing folding operations upon said shirt including second devices between and in spaced relation to said first devices adapted to engage the shirt, means for removing said first devices from said shirt after said second devices have engaged the shirt, and mechanism for causing said shirt to be removed from said second devices after said folding operations have been accomplished.

24. The combination as specified in claim 8, and mechanism for causing said shirt to be removed from said second devices after said folding operations have been accomplished.

25. In a folding machine, a surface for receiving a shirt in spread out condition, first devices for retaining said shirt on said surface while sleeves of the shirt are folded inwardly, means for accomplishing folding operations upon said shirt including second devices between and in spaced relation to said first devices adapted to engage the shirt, means for removing said first devices from said shirt after said second devices have engaged the shirt, an operating lever for controlling said first devices, and a motor for actuating said means for accomplishing folding operations, said first devices and said means for removing the first devices from said shirt.

26. In a folding machine, a surface for receiving a shirt in spread out condition, an operating lever, a motor, first devices for retaining said shirt on said surface while sleeves of the shirt are folded inwardly sometimes controlled by said operating lever and sometimes actuated and controlled by said motor, means adapted to be actuated by said motor to accomplish folding operations upon said shirt including second devices between and in spaced relation to said first devices adapted to engage said shirt, and means adapted to be actuated by said motor to remove said first devices from said shirt after said second devices have engaged the shirt.

27. In a folding and wrapping machine, a surface for receiving a shirt in spread out condition, first devices for retaining said shirt on said surface while sleeves of the shirt are folded inwardly, an expander for detachably retaining a collar on said shirt in fixed relation to said surface, means for accomplishing body folding operations on said shirt while said expander retains said collar in fixed relation to said surface including second devices between and in spaced relation to said first devices and at opposite sides of and in spaced relation to said expander adapted to engage the shirt, means operable from a normal to an abnormal position to fold a lower portion of the shirt about at least one of said devices and back to said normal position before said body folding means are operative, devices for retaining said lower portion of said shirt in folded position while said next to last mentioned means are operable from abnormal to normal positions, means for removing said first devices from the shirt and means for releasing said expander from said collar after said second devices have engaged said shirt, and mechanism for folding a strip of material about said shirt and connecting opposite end portions of said strip to each other after said shirt body folding means have operated.

28. The combination as specified in claim 10, a third device for engaging inwardly folded portions of the sleeves of said shirt while said means for folding a lower portion of the shirt is operating, and mechanism for causing said shirt when folded to be removed from said third device.

29. In a folding and sealing machine, a surface for receiving a foldable article, first means for folding a first portion of said article inwardly to be supported by said article and surface, second means operative upon completion of operation of said first means for folding a second portion of the article inwardly to cause a marginal end part of said second portion to be in engaged overlapped relation to a marginal end part of said first portion, a support for a strip of adhesive containing material for providing "stickers" each constituted as an integral part of said strip, mechanism operative concurrently with actuation of one of said folding means for advancing said strip, means operative concurrently with actuation of one of the folding means for severing a "sticker" from the strip, and means operative after said "sticker" is severed and before said strip is advanced for applying the severed "sticker" to said marginal end part of the second portion and an adjacent surface of said first portion.

30. In a folding and sealing machine, a surface for receiving a foldable article, first means for folding a first portion of said article inwardly to be supported by said article and surface, second means operative upon completion of operation of said first means for folding a second portion of the article inwardly to cause a marginal end part of said second portion to be in engaged overlapped relation to a marginal end part of said first portion, a support for a strip of adhesive containing material for providing "stickers" each constituted as an integral part of said strip, mechanism operative concurrently with actuation of one of said folding means toward inoperative position for advancing said strip, means operative concurrently with actuation of one of the folding means toward operative position for severing a "sticker" from the strip, and means operative after said "sticker" is severed and before said strip is advanced for attaching the severed "sticker" to said marginal end part of the second portion and an adjacent surface of said first portion.

31. In a folding and sealing machine, a surface for receiving a foldable article, first means for folding a first portion of said article inwardly to be supported by said article and surface, second means operative upon completion of operation of said first means for folding a second portion of the article inwardly to cause a marginal end part of said second portion to be in engaged overlapped relation to a marginal end part of said first portion, a support for a strip of adhesive containing material for providing "stickers" each constituted as an integral part of said strip, mechanism operative in response to actuation of said second means toward inoperative position for advancing said strip, means operative in response to actuation of the second means toward operative position for severing a "sticker" from the strip, and means operative in response to actuation of said second means to operative position for attaching the severed "sticker" to said marginal end part of the second portion and an adjacent surface of the first portion.

32. In a folding and sealing machine, a surface for receiving a foldable article, means for folding marginal end parts of spaced portions of said article one upon the other, a support for a strip of adhesive containing material for providing "stickers" each constituted as an integral part of said strip, mechanism for advancing said strip step by step, means for actuating said mechanism from an abnormal to a normal position to cause said strip to be fed and from said normal to said abnormal position to cause the mechanism to be reset, means operative concurrently with the performance of a folding operation on said article and actuation of said mechanism from said normal to said abnormal position to sever a "sticker" from said strip, and means operative after said "sticker" is severed and before said strip is advanced for removing the severed "sticker" from the machine and applying it to one of said marginal end parts and an adjacent surface of one of said spaced portions.

33. In a folding and sealing machine, a surface for receiving a foldable article, means for folding marginal end parts of spaced portions of said article one upon the other, a support for a strip of adhesive containing material for providing "stickers" each constituted as an integral part of said strip, mechanism for advancing said strip step by step, means for actuating said mechanism from an abnormal to a normal position to cause said strip to be fed and from said normal to said abnormal position to cause the mechanism to be reset, means operative in response to actuation of at least a part of said folding means toward operative position and said mechanism from said normal to said abnormal position to sever a "sticker" from said strip, and means operative in response to actuation of at least a part of said folding means to operative position and said mechanism to said abnormal position for removing the severed "sticker" from the machine and applying it to one of said marginal end parts and an adjacent surface of one of said spaced portions.

34. In a sealing machine, a support for a strip of adhesive containing material for providing "stickers" each constituted as an integral part of said strip, mechanism for advancing said strip step by step, means for actuating said mechanism from an abnormal to a normal position to cause said strip to be fed and from said normal to said abnormal position to cause the mechanism to be reset, means operative in response to actuation of said mechanism from said normal to said abnormal position to sever a "sticker" from said strip, and means operative in response to actuation of said mechanism to said abnormal position for removing the severed "sticker" from the machine.

35. In a sealing machine, a support for a strip of adhesive containing material for providing "stickers" each constituted as an integral part of said strip, a rotatably mounted sealing head including a plurality of sealing surfaces each having an intermediate portion thereof engaged by said strip, mechanism for rotating said sealing head step by step thus to cause said strip to be advanced, means for actuating said mechanism from an abnormal to a normal position to cause said sealing head to be rotated and from said normal to said abnormal position to cause the mechanism to be reset, means operative concurrently with actuation of said mechanism from said normal to said abnormal position to sever a "sticker" from said strip, and means operative after said "sticker" is severed and before said strip is advanced for removing the severed "sticker" from said sealing head.

36. In a sealing machine, a support for a strip of adhesive containing material for providing "stickers" each constituted as an integral part of said strip, a rotatably mounted sealing head including a plurality of sealing surfaces each having an intermediate portion thereof engaged by said strip, mechanism for rotating said sealing head step by step thus to cause said strip to be advanced, means for actuating said mechanism from an abnormal to a normal position to cause said sealing head to be rotated and from said normal to said abnormal position to cause the mechanism to be reset, means operative in response to actuation of said mechanism from said normal to said abnormal position to sever a "sticker" from said strip, and means operative in response to actuation of the mechanism to said abnormal position for removing the severed "sticker" from said sealing head.

37. In a folding and wrapping machine, a surface for receiving a shirt in spread out condition, first means for accomplishing folding operations upon said shirt transversely thereof including devices disposed longitudinally of the shirt, second means for folding a lower portion of said shirt longitudinally thereof about at least one of said devices before said first folding means are operative, and mechanism for wrapping a strip of material about said shirt and connecting opposite end portions of said strip to each other after said first folding means have operated.

38. The combination as specified in claim 37, an expander for detachably retaining a collar on said shirt in fixed relation to said surface, and means for releasing said expander from said collar after said first folding means have operated.

39. In a folding machine, a surface for receiving a shirt in spread out condition, first means for accomplishing a folding operation upon a body of said shirt, a device for retaining the shirt on said surface while said body folding operation is being accomplished, second means for folding a lower portion of said shirt upon the shirt body before said first folding means are operative, and mechanism for wrapping a strip of material about said shirt and connecting opposite end portions of said strip to each other after said first folding means have operated.

40. In a folding machine, a surface for receiving a shirt in spread out condition, first means for accomplishing folding operations upon said shirt including devices adapted to engage the shirt, second means operable from a normal to an abnormal position to fold a lower portion of the shirt about at least one of said devices and back to said normal position before said first folding means are operative, and mechanism for retaining said lower portion of said shirt in folded position while said second folding means is operable from abnormal to normal position.

41. In a folding machine, a surface for receiving a shirt in spread out condition, first means for accomplishing folding operations upon said shirt transversely thereof including devices disposed longitudinally of the shirt, second means operable from a normal to an abnormal position to fold a lower portion of the shirt longitudinally thereof about at least one of said devices and back to said normal position before said first folding means are operative, and mechanism for retaining said lower portion of said shirt in folded position while said second folding means is operable from abnormal to normal position.

42. The combination as specified in claim 41, an expander for detachably retaining a collar on said shirt in fixed relation to said surface, and means for releasing said expander from said collar after said first folding means have operated.

43. In a folding machine, a surface for receiving a shirt in spread out condition, first means for accomplishing a folding operation upon a body of said shirt, a device for retaining the shirt on said surface while said body folding operation is being accomplished, second means operable from a normal to an abnormal position to fold a lower portion of said shirt upon the shirt body and back to said normal position before said first holding means are operative, and mechanism for retaining said lower portion of said shirt in folded position while said second folding means is operable from abnormal to normal position.

44. In a sealing machine, a surface for supporting articles to receive "stickers" each constituted as an integral part of a strip of adhesive containing material, a support for said strip, a rotatably mounted sealing head including a plurality of sealing surfaces engaged by said strip, a hold-down plate for successively engaging articles, one at a time, upon said supporting surface each of which articles is to receive a "sticker" in response to movement of the sealing head toward the supporting surface, mechanism for rotating said sealing head step by step to cause said strip to be advanced and sealing surfaces to become successively situated one at a time opposite said supporting surface and adjacent said hold-down plate, means interconnecting said sealing head and hold-down plate for positioning and retaining each sealing surface while situated opposite the supporting surface in substantially parallel relation to the hold-down plate, and means for actuating said mechanism from an abnormal to a normal position to cause said sealing head to be rotated and from said normal to said abnormal position to cause the mechanism to be reset.

45. In a sealing machine, a support for a strip of adhesive containing material for providing "stickers" each constituted as an integral part of said strip, a rotatably mounted sealing head including a plurality of sealing surfaces engaged by said strip, mechanism for rotating said sealing head step by step thus to cause said strip to be advanced, means for actuating said mechanism from an abnormal to a normal position to cause said sealing head to be rotated and from said normal to said abnormal position to cause the mechanism to be reset, and a severing device operative in response to actuation of said mechanism from said normal to said abnormal position and bodily in direction counter to that in which said sealing head is rotated to sever a "sticker" from said strip.

46. The combination as specified in claim 45, and means operative in response to actuation of the mechanism to said abnormal position for removing the severed "sticker" from said sealing head.

47. In a shirt folding machine, a surface for receiving a shirt in spread out condition, a device for retaining said shirt on said surface and mechanism for folding a lower end portion of said shirt upon itself and about said device to a position where rested in a double fold upon a body portion of the shirt, said mechanism being constituted as a member engageable with an under surface of an intermediate part of said shirt lower end portion between the device and the lower end of the shirt in spaced relation to both said device and said shirt lower end, an actuator operable first to move said member toward the shirt body portion past an upper surface of said device thus to situate an upper part of the shirt lower end portion adjacent the device upon said shirt body portion and a lower part of said shirt lower end portion adjacent said lower end of the shirt upon the upper part of said shirt lower end portion and second to move the member away from said shirt body portion past the device to position clear of said shirt lower end portion and device, and an operative connection between said member and said actuator.

48. The combination as specified in claim 47, and mechanism for retaining said lower end portion of the shirt in folded position upon said shirt body portion while said actuator is accomplishing movement of said member away from said shirt lower end portion.

49. In a shirt folding machine, a surface for receiving a shirt in a spread out condition, a device for retaining said shirt on said surface and mechanism for folding a lower end portion of said shirt upon itself and about said device, said mechanism being constituted as a member engageable with an under surface of an intermediate part of said shirt lower end portion between the device and the lower end of the shirt in spaced relation to both said device and said lower end, an actuator operable first to move said member toward the shirt body portion past an upper surface of said device thus to situate the shirt lower end portion adjacent the device upon said shirt body portion and second to move the member away from said shirt body portion past the device to position clear of said shirt lower end portion and device, and an operative connection between said member and said actuator.

50. The combination as specified in claim 49, and mechanism for retaining said lower end portion of the shirt in folded position upon said shirt body portion while said actuator is accomplishing movement of said member away from said shirt lower end portion.

References Cited in the file of this patent

UNITED STATES PATENTS

| Number | Name | Date |
|---|---|---|
| 1,715,585 | Woodworth | June 4, 1929 |
| 1,868,871 | Bergstein | July 26, 1932 |
| 2,010,333 | Steele | Aug. 6, 1935 |
| 2,285,063 | Steele | June 2, 1942 |
| 2,362,976 | Cooper | Nov. 21, 1944 |
| 2,502,257 | Hawkins | Mar. 28, 1950 |
| 2,556,079 | Gayring | June 5, 1951 |
| 2,616,594 | Calder et al. | Nov. 4, 1952 |